(12) United States Patent
Kamiya

(10) Patent No.: US 7,259,885 B2
(45) Date of Patent: Aug. 21, 2007

(54) IMAGE FORMING APPARATUS WITH GAMMA CONVERSION MEANS

(75) Inventor: Yuji Kamiya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 11/080,490

(22) Filed: Mar. 16, 2005

(65) Prior Publication Data

US 2005/0195444 A1    Sep. 8, 2005

Related U.S. Application Data

(62) Division of application No. 09/797,991, filed on Mar. 5, 2001, now Pat. No. 6,987,576.

(30) Foreign Application Priority Data

Mar. 6, 2000  (JP) .............................. 2000-060284
Jul. 25, 2000 (JP) .............................. 2000-223726

(51) Int. Cl.
*G06F 15/00*  (2006.01)
*B41B 1/00*   (2006.01)

(52) U.S. Cl. ..................... 358/1.15; 358/1.13; 358/519
(58) Field of Classification Search ................. 358/1.1, 358/1.9, 1.11–1.18, 461, 519
See application file for complete search history.

(56) References Cited

U.S. PATENT DOCUMENTS

| | | | | |
|---|---|---|---|---|
| 5,170,210 A | * | 12/1992 | Saruwatari | 399/44 |
| 6,418,280 B2 | | 7/2002 | Kamiya | 399/46 |
| 6,493,524 B2 | | 12/2002 | Kamiya | 399/48 |
| 6,560,351 B1 | * | 5/2003 | Hirota | 382/108 |

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

The invention provides an image forming apparatus and an image forming method, capable of providing an image with little deterioration, even in case the image contrast has to be adjusted not for the purpose of image adjustment, such as for reducing the toner consumption amount or for preventing the leak in the charging device.

7 Claims, 18 Drawing Sheets

IMAGE FORMING APPARATUS WITH GAMMA CONVERSION MEANS

This is a divisional of U.S. patent application Ser. No. 09/797,991, filed on Mar. 5, 2001, now U.S. Pat. No. 6,987,576, and allowed on Nov. 19, 2004.

BACKGROUND OF THE INVENTION

1. Field of the Invention

The present invention relates to an image forming apparatus such as a copying apparatus or a printer, and more particularly to gamma (γ) conversion for use therein.

2. Related Background Art

For adjusting image density in an image forming apparatus, there are known digital image processing methods and analog adjustment methods. The digital image processing methods include an adjustment with luminance-density conversion means for converting a received original luminance signal into an original density signal, an adjustment with output density conversion means for converting an original density signal into an output density signal, and an adjustment constituted by an inverse function of the printer characteristics representing an output density signal corresponding to an output signal. In general, the adjustment by the gamma conversion means is easiest for adjusting the image density, and is more direct and accurate in determining the printer characteristics.

For analog adjustment, it is common to adjust the potential of the latent image or the development potential. There are other adjustable parameters such as toner amount of the development means, development frequency, various adjusting gaps in the development means and a gap between the development means and the electrophotographic photosensitive member, but the latent image potential and the development potential has conventionally been employed in consideration of ease of the adjustment. Particularly, the most common parameter is the development contrast which is the difference between the latent image potential inducing the toner adhesion on the electrophotographic photosensitive member and the development potential of the development means.

The digital image adjustment represented by the adjustment of the content of conversion of the gamma conversion means is capable of adjusting the density in the halftone area relatively according to the desire, but cannot adjust the density of an area in which the toner is deposited with the maximum amount (hereinafter represented as Dmax) or the fog level in an area where the toner is not deposited.

On the other hand, the analog image adjustment represented by the adjustment of the development contrast can adjust not only the density of the halftone area but also Dmax in mutual linkage. The fog level in the area without the toner adhesion scarcely changes unless the back contrast, relating to the difference between the development potential and the potential in the area without the toner adhesion, is altered.

Also, the digital image adjustment and the analog image adjustment as described in the foregoing may conventionally be designated individually, but there has not existed an algorithm or a sequence capable of automatically linking the two in the image forming apparatus.

It is to be noted that there may result a situation where the development contrast has to be altered not fur the purpose of the image adjustment, for example for reducing the toner consumption amount or for avoiding the leakage of the charging means for providing the photosensitive member with a potential. As explained in the foregoing, a change in the development contrast alone results in a change in the density of the halftone area and Dmax in linkage. The resulting image therefore provides an impression of significantly deteriorated image quality.

SUMMARY OF THE INVENTION

In consideration of the foregoing, the object of the present invention is to provide an image forming apparatus and an image forming method capable of maintaining a halftone density by gamma conversion thereby outputting an image with little deterioration in the image quality even in case the image contrast has to be altered not for the purpose of image adjustment.

The present inventors have investigated means for avoiding the impression of deteriorated image quality in the image, even in case of altering the development contrast for the purpose of reducing the toner consumption amount or for avoiding the leak of the charging means. As the basis of the present invention, the present inventors have found following two experimental rules.

A first rule is that the impression of deterioration of an image is principally cause by the density of the halftone area, and is therefore not much dependent on Dmax and that an impression satisfactory to most users can be given even if Dmax is somewhat lowered, as long as the density can be maintained in the halftone area. For example, in the ordinary visual observation of the image, the image quality does not appear to be deteriorated if a reflective density at least equal to 1.1 is obtained.

A second rule is that the toner consumption amount is reduced by lowering Dmax even if the density of the halftone area is made somewhat higher. This phenomenon is based on a fact that the deposited amount of toner is larger in the Dmax area than in the halftone area.

In consideration of these two experimental rules, an optimum image can be provided if the halftone density can be maintained by an adjustment of the content of conversion in the gamma conversion means when the development contrast is altered, since such change in the development contrast lowers Dmax to reduce the toner consumption amount and to prevent the leakage in the charging means while the image does not give deteriorated impression because of the maintained halftone density. More specifically, if the development contrast becomes deficient, the content of the gamma conversion means is to be so adjusted as to provide a halftone density higher than in the normal case.

In the present invention, therefore, there is adopted a configuration of reading the development contrast in the printer portion and the gamma conversion means provides a result of conversion corresponding to such development contrast.

Also, except for the aforementioned adjustment of the development contrast not intended for image adjustment, such as for reducing the toner consumption amount or for avoiding the leak in the charging means, the convent of conversion of the gamma conversion means is not adjusted in case of the adjustment of the development contrast for the purpose of image adjustment. This is because, in case of reducing the halftone density by reducing the development contrast for example in the image density adjustment for the purpose of general image adjustment or coping with the environmental fluctuation of the development means, if the content of conversion of the gamma conversion means is adjusted, such image processing results in an increase in the halftone density, thus attenuating the effect of the present invention.

The aforementioned object of the present invention can be attained, according to the present invention, by an image forming apparatus provided with:

a luminance-density conversion means for converting an original luminance signal into an original density signal;

an output density conversion means for converting the obtained original density signal into an output density signal;

a gamma conversion means for converting into an output signal corresponding to the output density signal;

a charging means for providing an electrophotographic photosensitive member with a uniform charge;

a digital exposure means for exposing the electrophotographic photosensitive member after the charging to the output signal after the gamma conversion thereby forming a latent image; and a development means for developing the latent image with toner to obtain a visible image;

in which the image is rendered visible by forming a latent image potential which the surface potential of the electrophotographic photosensitive member formed by the charging means and the exposure means, and a development potential applied to the development means, the apparatus comprising:

an environment detection means for detecting at least either of the temperature and the humidity of the location where the image forming apparatus is positioned;

wherein the content of conversion of the gamma conversion means is modulated according to the development contrast which is the difference between the latent image potential causing the adhesion of the toner flying from the development means to the electrophotographic photosensitive member and the development potential, depending on the change amount of the gamma conversion means corresponding to the change amount of the development amount in the result of detection by the environment detection means and the weight of the gamma conversion means corresponding to the change amount of the contrast in other cases.

According to the present invention, there is also provided an image forming apparatus provided with a luminance-density conversion means for converting an original luminance signal into an original density signal; an output density conversion means for converting the original density signal obtained by the luminance-density conversion means into an output density signal; a gamma conversion means for executing gamma conversion on the output density signal obtained in the output density conversion means into an output signal, a charging means for providing an electrophotographic photosensitive member with a uniform charge; an exposure means for exposing the electrophotographic photosensitive member after the charging by the charging means to an exposure by the output signal thereby forming a latent image; and a development means for developing the latent image formed by the exposure means with toner to obtain a visible image; wherein the image is rendered visible by forming a latent image potential which is the surface potential of the electrophotographic photosensitive member formed by the charging means and the exposure means and a development potential applied to the development means;

wherein the content of conversion of the gamma conversion means is modulated according to the development contrast which is the difference between the latent image potential causing the adhesion of the toner flying from the development means to the electrophotographic photosensitive member and the development potential.

Other objects of the present invention, and the features thereof, will become fully apparent from the following detailed description which is to be taken in conjunction with the accompanying drawings.

DETAILED DESCRIPTION OF THE PREFERRED EMBODIMENTS

In the following, the present invention will be clarified in detail by the embodiments thereof, taking a laser printer as an example. However, the present invention may be realized not only by a laser printer but also by any image forming apparatus of digital type.

Also the present invention may be realized not only in the form of an apparatus but also in the form of an image forming method based on the description of the embodiments.

First Embodiment

Figure 1:
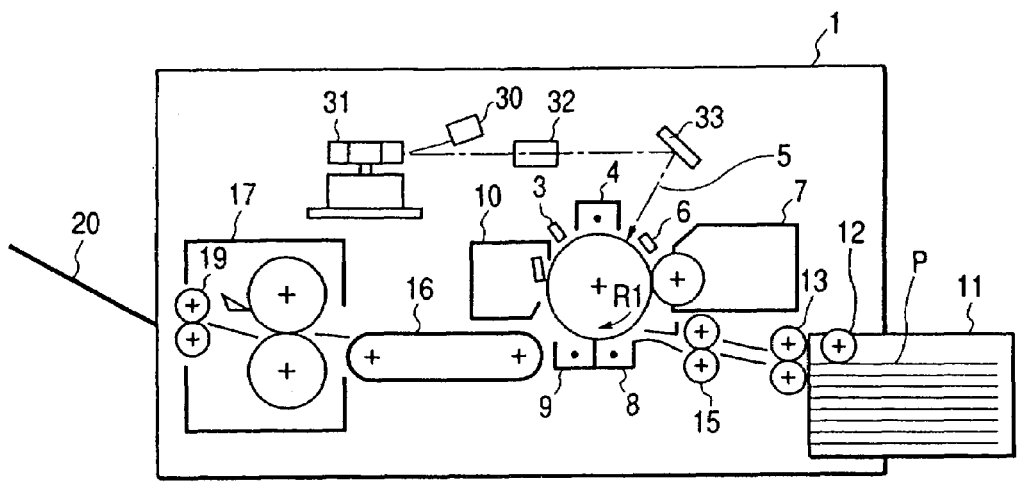
FIG. 1 is a view showing the configuration of the first embodiment.

FIG. 1 schematically shows a laser printer constituting the first embodiment. The printer is provided, at the approximate center of a main body 1, with a cylindrical photosensitive drum 2 constituting an electrophotographic photosensitive member. The photosensitive drum 2 is supported in the main body 1 and is rotated in a direction R1, and, along the periphery of the photosensitive drum 2 and in an order of the rotating direction thereof, a charge eliminating unit 3 for eliminating the potential on the photosensitive drum 2, a primary charger 4 constituting charging means for uniformly charging the surface of the photosensitive drum 2, exposure means 5 for exposing the surface of the photosensitive drum 2 thereby forming an electrostatic latent image, a potential sensor 6 for measuring the potential on the photosensitive drum 2 after exposure, a development unit 7 constituting development means for adhering toner to the electrostatic latent image thereby forming a toner image, a transfer charger 8 for transferring the toner image onto a transfer material P, a separating charger 9 for separating the transfer material P from the photosensitive drum 2, and a cleaner 10 for removing the toner remaining on the photosensitive drum 2.

The transfer material P to which the toner image is to be transferred is fed from a paper feeding deck 11. Below the photosensitive drum 2, namely in the lower part of the interior of the main body 1 of the apparatus, there is provided the paper feeding deck 11 containing the transfer material P. The transfer material P in the deck 11 is fed by a feeding roller 12, and is supplied through conveying rollers 13 and registration rollers 15 to a space between the photosensitive drum 1 and the transfer charger 8. In this position, the transfer material P receives transfer of the toner image from the photosensitive drum 2, and is conveyed by a conveyor belt 16 to a fixing unit 17. After the fixation of the toner image by heat and pressure provided by the fixing unit 17, the transfer material P is discharged as the final output image by discharge rollers 19 onto a discharge tray 20.

In the exposure means 5 of the aforementioned printer, a laser beam emitted from a semiconductor laser 30 according to an image signal is put into a scanning motion by a polygon mirror 31, and is guided through an imaging lens 32 and a mirror 33 to the photosensitive drum 2.

Figure 2:
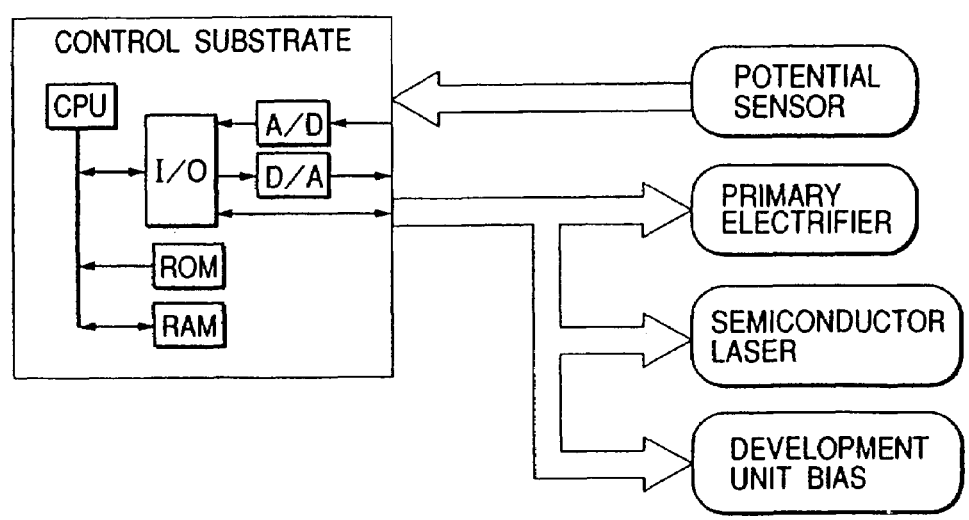
FIG. 2 is a view showing the electrical configuration of a control board and peripheral components thereof.

FIG. 2 is a view schematically showing the electrical configuration of a control board for measuring the potential on the photosensitive drum 2 and peripheral components. Referring to FIG. 2, a ROM storing a control program and a RAM constituting a temporary memory element for the data required in the execution of the control program are connected to a CPU which is the core of the process execution. Also an interface (I/O) and A/D and D/A converters for data conversion are connected with external peripheral devices, whereby the information is inputted into or outputted from the control board. As a peripheral device, a potential sensor is provided for measuring the potential on the photosensitive drum after charging and after exposure. The voltage applied to the primary charger and the output value applied to the semiconductor laser can be controlled in order to form desired dark voltage and light voltage on the photosensitive drum 2. Also a development potential can be formed on the development unit 7 thereby causing the toner to fly to the photosensitive drum 2. The potential applied to the development unit 7 is in practice composed of superimposed DC and AC components, but, in the present embodiment, the development potential is represented by a DC component.

Figure 3:
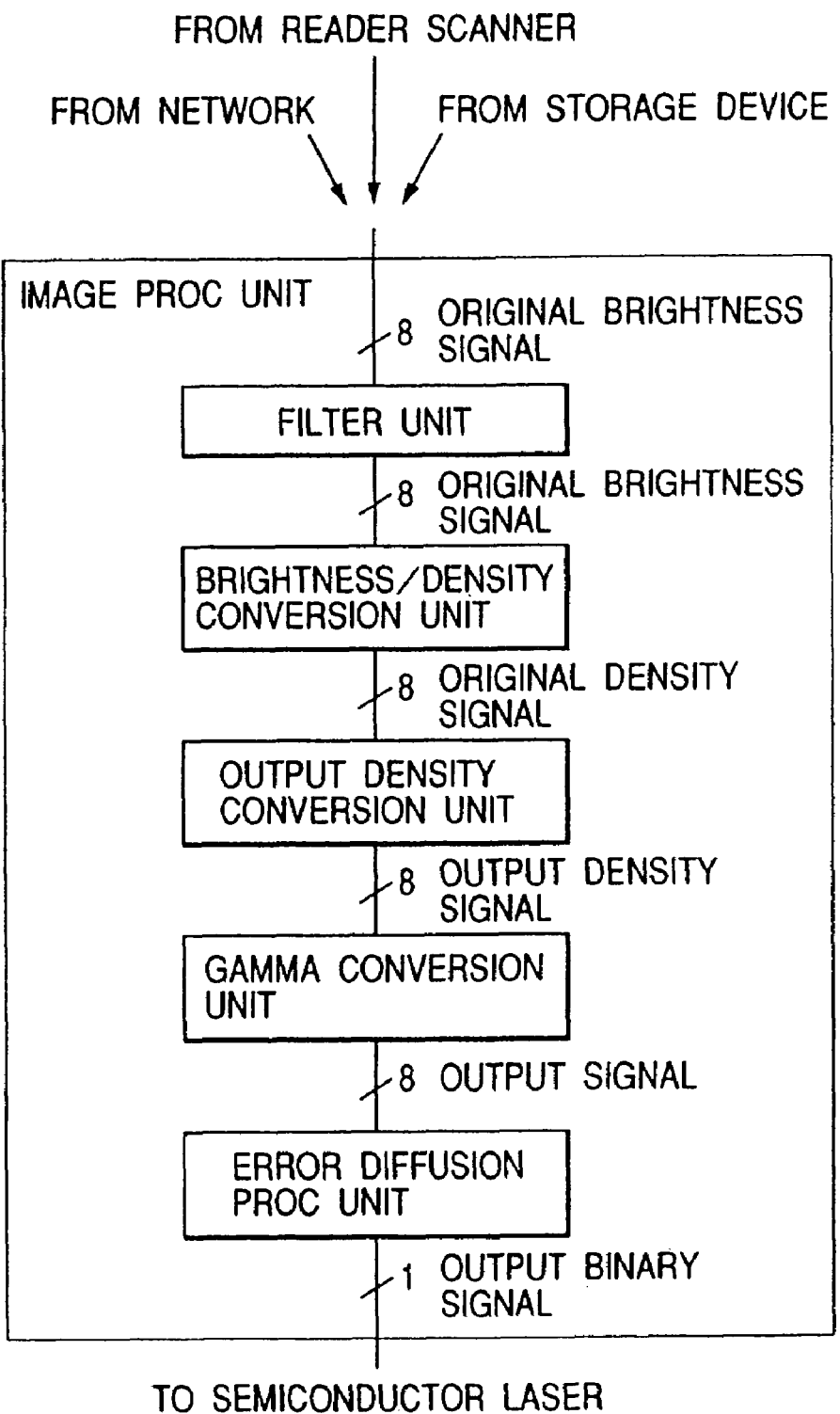
FIG. 3 is a view showing the configuration of an image processing unit.

FIG. 3 is a schematic view showing the configuration of a digital image processing unit. An original image is entered into an image processing unit as an 8-bit signal, either through a reader scanner network constituting a reading apparatus or from a memory apparatus such as a hard disk. The original image is subjected to a filter process in a filter process unit, in order to enhance the edge portion of the image. Then a luminance image constituting the original image is subjected to a luminance-density conversion in a luminance-density conversion unit for conversion into a density signal. The density signal constituting the original image is subjected to an output density conversion process in an output density conversion unit, for conversion into the output density corresponding to an output density pattern selected by the user. The output density pattern is selected by the user on an operation panel not shown in FIG. 1 but constituting a user interface, and can be a character mode in which emphasis is given to the contrast of the output image for outputting principally a character original, or a photograph mode in which emphasis is given to the gradation of the output image for outputting principally a photograph original, or a character-photograph mode for outputting an intermediate image between the character mode and the photograph mode. A gamma conversion unit executes a gamma conversion in consideration of the output characteristics of the printer, on thus obtained output density signal. An output signal for obtaining the output density is determined by such gamma conversion. A table in the gamma conversion unit is constituted by determining an inverse function for the output signal to be outputted to the exposure system of a predetermined printer and for a correlation table of the density signal. Such output signal is converted into binary level in an error diffusion process unit for conversion from an 8-bit signal to a binary signal. Such binary output signal is supplied to a semiconductor laser 30 constituting an exposure system whereby a latent image, converted from the original image, is recorded on the photosensitive drum 2. The error diffusion process unit provides such a binary image that is microscopically a binary image but can macroscopically be observed as a multi-value image.

Figure 4:
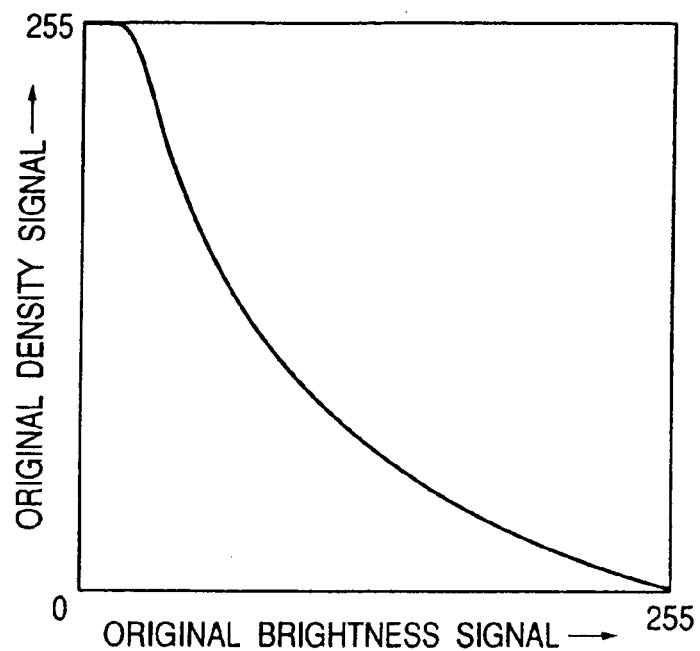
FIG. 4 is a chart showing a conversion table of a luminance-density conversion unit.

FIG. 4 shows the characteristics of a conversion table in the luminance-density conversion unit, which, being an application of logarithmic conversion, serves to compress the signal change in a dark area which is not clear to the human eyes and to expand the signal change in a light area where the change is more easily observed by the human eyes.

Figure 5:
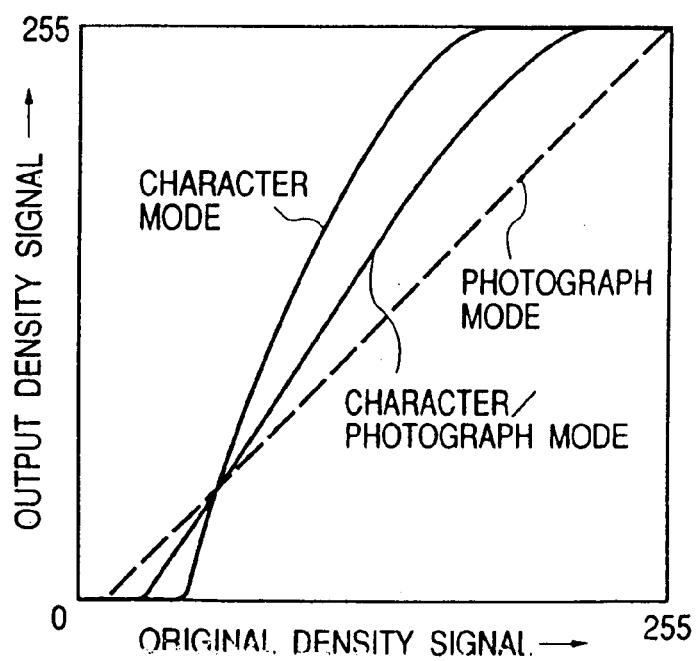
FIG. 5 is a chart showing a conversion table of an output density conversion unit.

FIG. 5 shows the characteristics of a conversion table in the output density conversion unit. In the present embodiment there are provided three tables, in which, in the character mode giving emphasis to the contrast of the output image in order to principally output a character original, the lighter area is more or less skipped, while, in the photograph mode giving emphasis to the gradation of the output image in order to principally output a photograph original, the density signal of the original and the output density signal are in a relatively smooth linear relationship, thereby maintaining the gradation. On the other hand, the character-photograph mode has an interim character between the character mode and the photograph mode.

Figure 6:
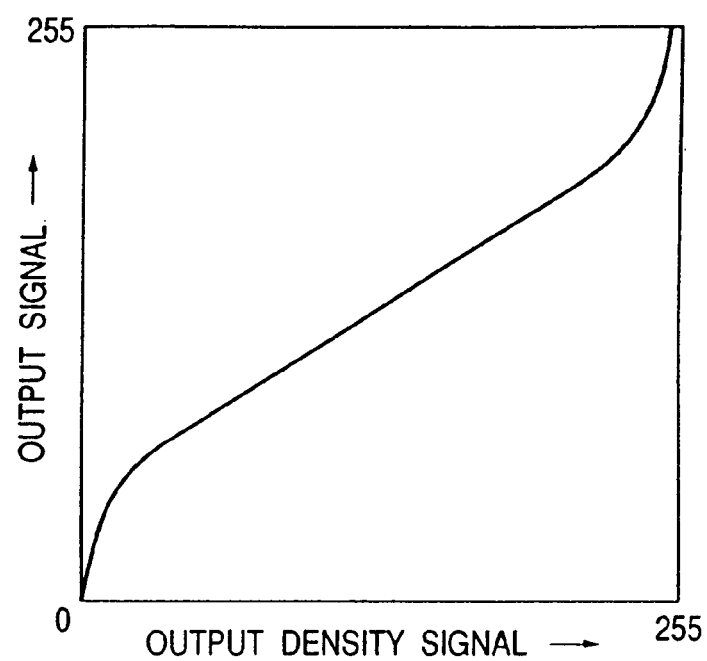
FIG. 6 is a chart showing a conversion table of a gamma conversion unit.
Figure 7:
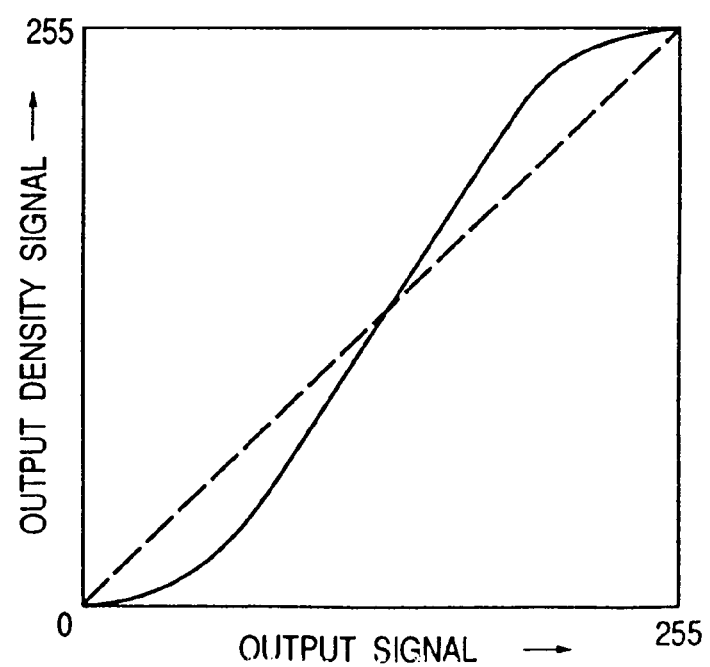
FIG. 7 is a chart showing a conversion table indicating density characteristics for an output signal.

FIG. 6 shows the characteristics of a conversion table in the gamma conversion unit. In the gamma conversion unit, there is retained the relationship of the output signal for obtaining the desired density, and the gamma conversion table is given by investigating in advance the density characteristics for an arbitrary output signal and determining an inverse function of a table Γ obtained by approximating or interpolating such density characteristics with curved or straight lines as shown in FIG. 7.

Figure 8:
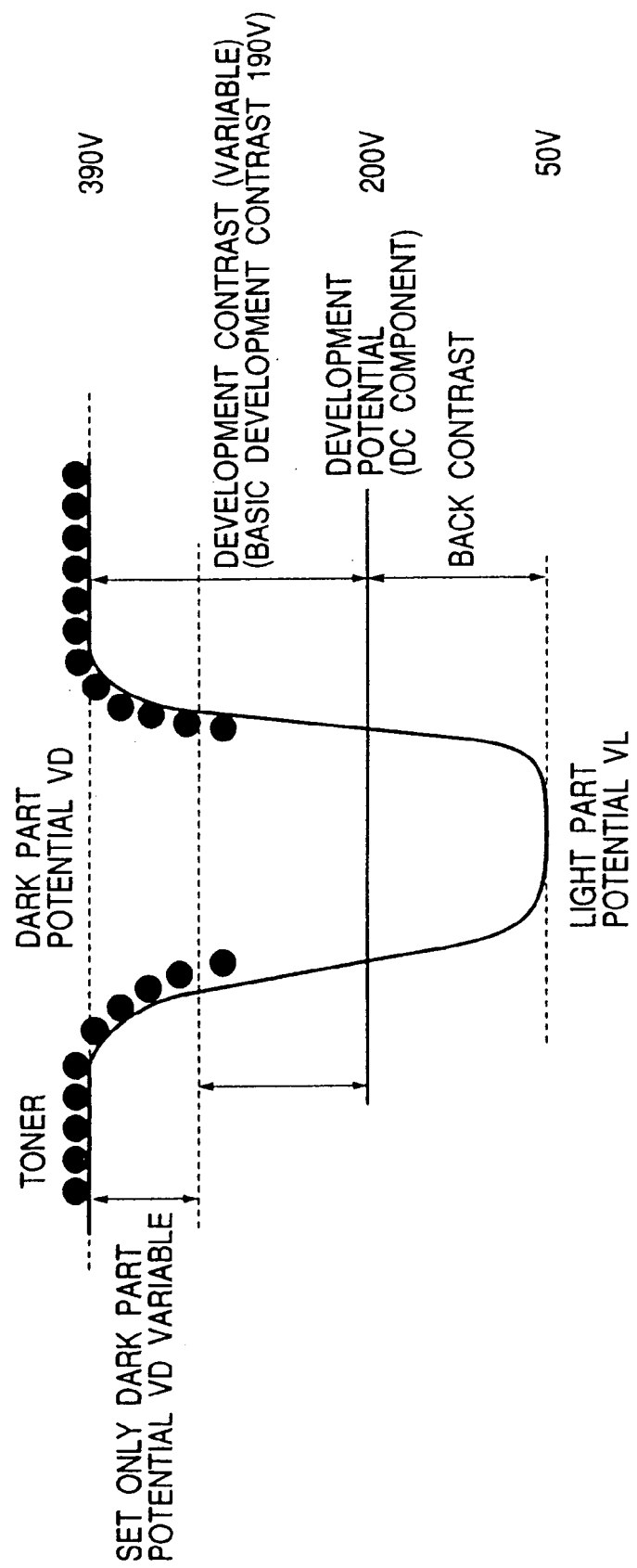
FIG. 8 is a view showing a latent image potential and a development potential in a background exposure system.

FIG. 8 is a chart showing a latent image potential and a development potential in the present embodiment. Since the present embodiment employs a background exposure method in which the toner flies principally to an area not exposed to the light of the semiconductor laser, the toner adheres to a dark potential area of the photosensitive drum 2. A light potential area constitutes so-called white area though a certain fog is generated. A development potential indicates a DC component of a bias voltage applied to the development unit. Depending upon the magnitude of the development contrast which is the difference between the dark potential and the light potential, there are varied the adhesion amount of the toner and the halftone density even in the digital apparatus. In the present embodiment, there are adopted basic conditions of a dark potential of 300V, a light potential of 50V, a development potential of 200V and a development contrast of 190V. In the present embodiment, the development contrast is adjusted by the adjustment of the dark potential by a change in the applied voltage to the primary charger. The back contrast, which is the difference between the development potential and the light potential, is not changed in the present embodiment.

Figure 9:
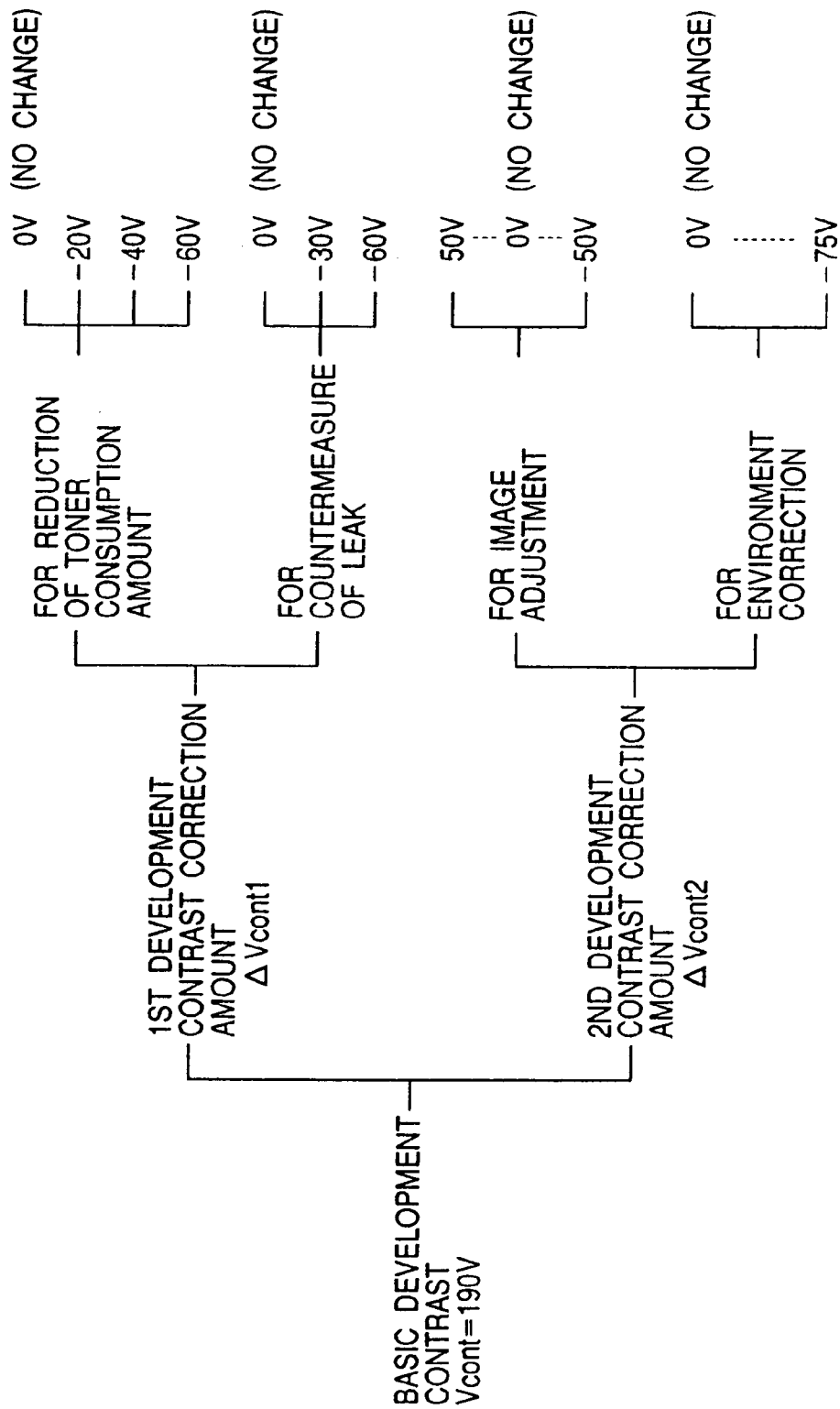
FIG. 9 is a chart showing adjustment items for determining the development contrast.

FIG. 9 is a view showing adjustment items for determining the development contrast in the present invention. The basic development contrast (Vcont) is 190V as explained in the foregoing with reference to FIG. 8. For correcting the basic development contrast in the present embodiment, there are added or subtracted a first development contrast correction amount ΔVcont1 and a second development contrast correction amount ΔVcont2. Therefore, the total amount of the development contrast at the actual output operation by the printer is represented by:

$$\text{total development contrast} = V\text{cont} + \Delta V\text{cont1} + \Delta V\text{cont2} \quad (1)$$

As will be explained later, the development contrast not including the second development contrast correction amount ΔVcont2 is defined as VcontNow, which is defined as follows:

$$V\text{contNow} = V\text{cont} + \Delta V\text{cont2} \quad (2)$$

The first development contrast correction amount ΔVcont1 is further divided into following two applications:

namely for reducing the toner consumption amount and for avoiding leak in the charger. For the purpose of reducing the toner consumption amount, the ΔVcont1 can be switched to 0V (no change), −20V, −40V or −60V. A reduction of the development contrast allows to reduce the adhesion amount of the toner to the dark potential, thereby lowering the toner consumption amount. To avoid leak of the charger, it can be switched to 0V (no change), −30V or −60V. The prevention of leak means the following. When the voltage applied to the primary charger is elevated, the primary charger in the printer located in a low air pressure situation generates spark discharge, and the dark potential has to be lowered in order to avoid the drawbacks resulting from such spark discharge.

The second development contrast correction value ΔVcont2 is also divided into two applications, namely for image adjustment and for environmental adjustment. For the purpose of image adjustment, it can be finely set within a range from −50V to +50V. It is used by the service person for the printer or the user of the printer for the purpose of adjusting the entire image density to the darker or lighter side under the observation of the outputted image. For the purpose of environmental adjustment, the result of detection is read from a temperature-humidity sensor provided inside the printer for calculating the moisture in the environment where the printer is installed, and the development contrast is automatically and continuously adjusted from 0V to −75V according to the moisture. This adjustment is executed in order to avoid a phenomenon that the development unit in the printer shows a higher development ability in a lower moisture environment than in a higher moisture environment, whereby the toner adhesion amount becomes higher even if the surface potential of the photosensitive drum is maintained constant. Naturally such tendency is affected by the development characteristics of the development unit, and, in the present embodiment, the amount of reduction of ΔVcont2 had to be made larger as the moisture becomes lower.

It is to be noted that the second development contrast correction amount ΔVcont2 is for image adjustment upon observation of the output image or for environmental adjustment corresponding to the state of the development unit, and is therefore to be adjusted manually or automatically according to the image. Consequently, in contrast to the first development contrast correction value ΔVcont1, the ΔVcont2 varies the development contrast so as to optimize the image quality. Stated differently, the second development contrast correction value ΔVcont2 is used in order to decrease Dmax and the halftone density when they are excessively high or to increase these when they are excessively low, and the density adjustment beyond these purposes should not be executed in digital manner.

On the other hand, the first development contrast correction amount ΔVcont1 is used for altering the development contrast regardless of the image quality. In case there is employed only one gamma conversion table as shown in FIG. 6, the lowering of Dmax indicating the density of the toner adhering to the dark potential also results in a lowering of the macroscopic halftone density, thus giving a strong impression of image quality deterioration to the user.

Therefore, the present embodiment enables to prevent the image deterioration without lowering of the halftone density, by preparing a gamma conversion table according to the first development contrast correction amount ΔVcont1 as the digital density adjustment.

Figure 10:
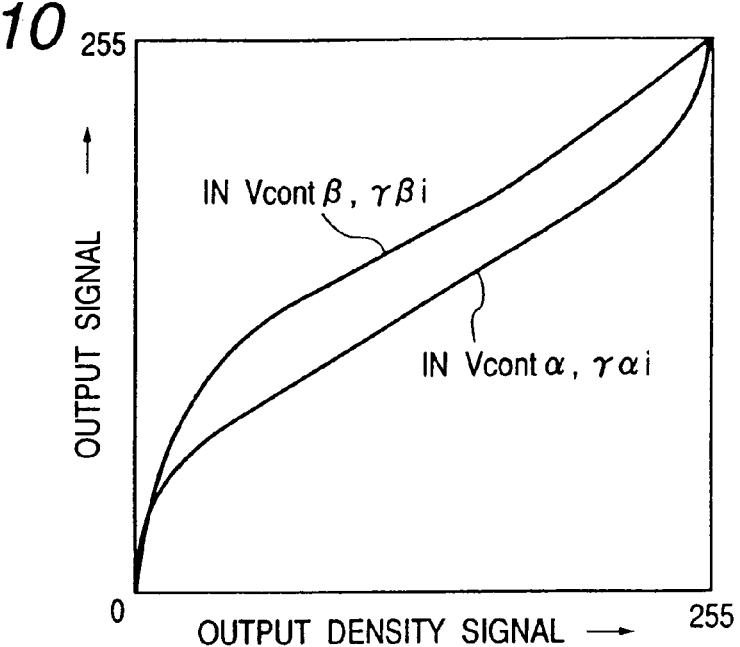
FIG. 10 is a chart showing a gamma conversion table prepared in advance.

FIG. 10 shows two gamma conversion tables prepared in advance in the printer of the present embodiment. The two gamma conversion tables-consist of a gamma conversion table (γα1) for a case in which the first development contrast correction amount ΔVcont1 is 0V, namely for a situation where Vcont+ΔVcont1 is 190V (Vcontα) including the basic development contrast of 190V regardless of the second development contrast correction amount ΔVcont2, and a gamma conversion table (γβ1) for a case in which the first development contrast correction amount ΔVcont1 is −50V, namely for a situation where Vcont+ΔVcont1 is 140V (Vcontβ) including the basic development contrast of 190V regardless of the second development contrast correction amount ΔVcont2. The suffix i of the gamma conversion table indicates the 8-bit value of the output density signal of the table and assumes a value within a range of 0 to 255.

Figure 11:
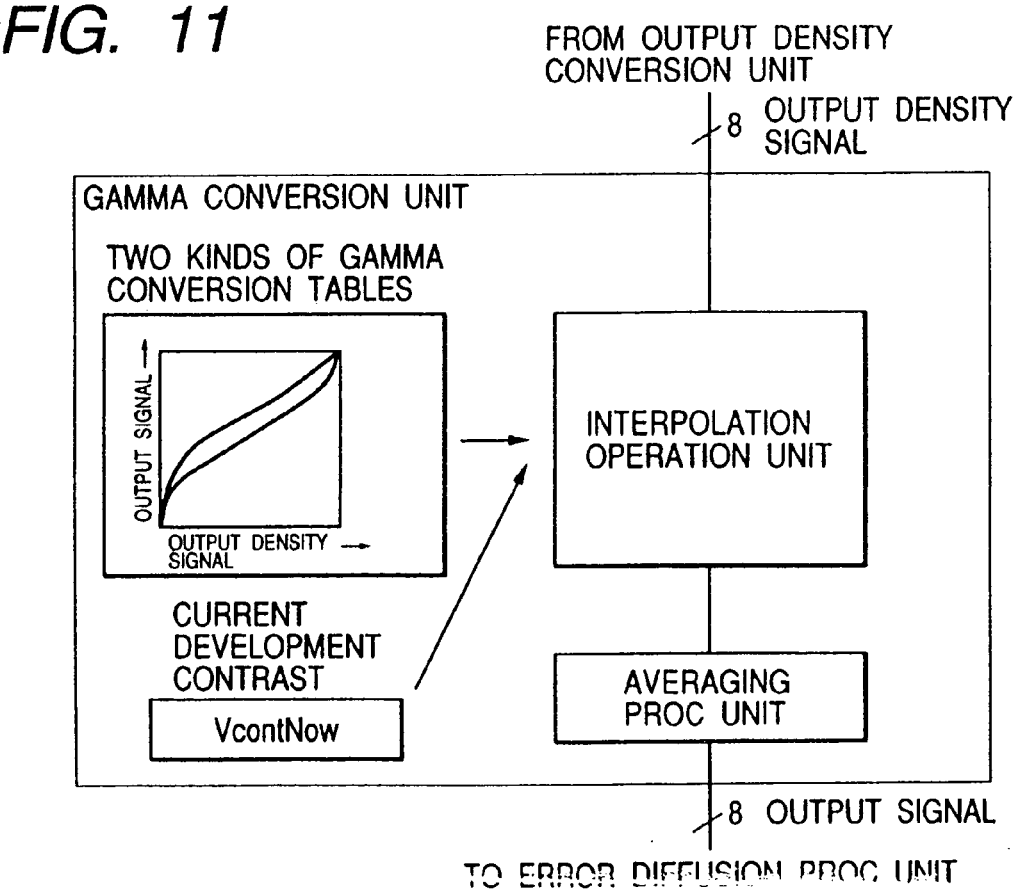
FIG. 11 is a view showing the configuration of a gamma conversion unit.

The present embodiment functions with the aforementioned two gamma conversion tables, namely replacing the gamma conversion unit shown in FIG. 3 with that shown in FIG. 11. The gamma conversion unit shown in FIG. 11 is provided with two gamma conversion tables. Also, as shown in FIG. 9, VcontNow is determined as the sum of the basic development contrast Vcont and the first development contrast correction value ΔVcont1. The VcontNow varies within a range of 190V to 70V, based on the set values shown in FIG. 9. As the reduction of the toner consumption amount and the prevention of leak are not used often in combination in practice, it is generally used in the range of 190V to 130V. An interpolation calculation unit shown in FIG. 11 executes calculation based on the VcontNow, the relationship between Vcontα and Vcontβ, the conversion table at Vcontα and the conversion table at Vcontβ, according to an interpolation equation:

$$\gamma Nowi = \gamma\alpha i + (\gamma\beta i - \gamma\alpha i) \times (Vcont\alpha - VcontNow)/(Vcont\alpha - Vcont\beta) \quad (3)$$

wherein the suffix i of the gamma conversion table is an 8-bit value of the output density signal of the table, assuming a value within a range of 0 to 255. The foregoing equation naturally assumes a value γNowi=γαi in case VcontNow=Vcontα, or γNowi=γβi in case VcontNow=Vcontβ.

Figure 12:
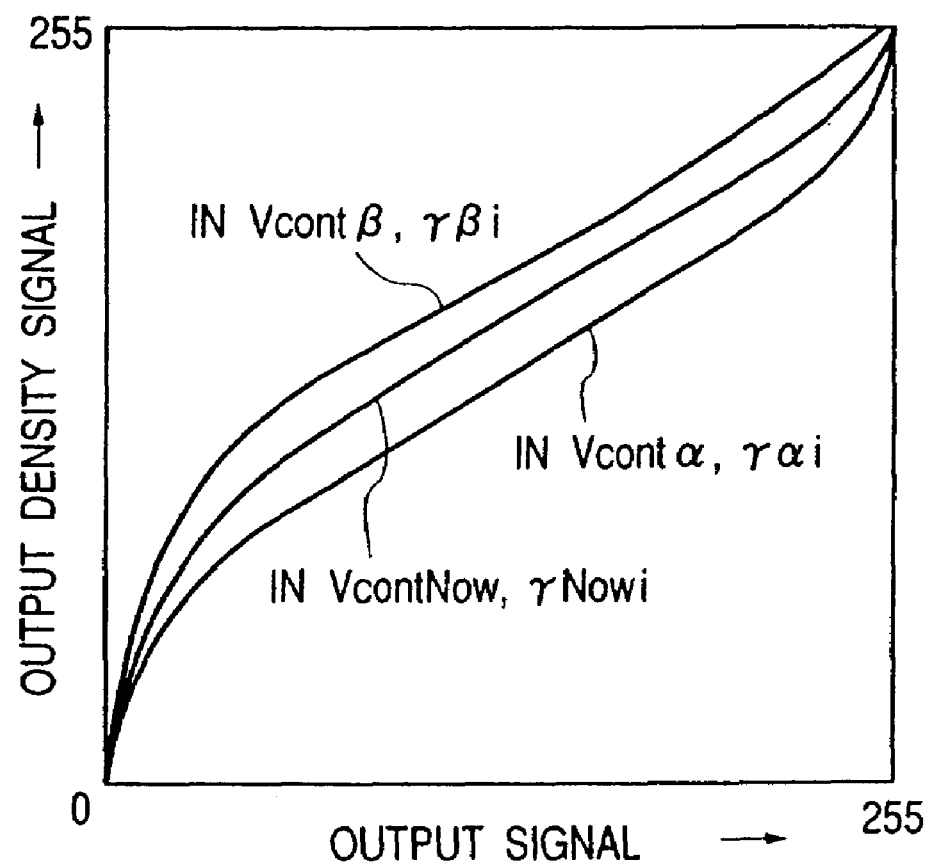
FIG. 12 is a chart showing an example of γNowi.

FIG. 12 shows an example of the result of calculation by the equation (3). In FIG. 12, γNowi is obtained by interpolation from the two γαi, γβi, the VcontNow which is the sum of the basic development contrast Vcont and the first development contrast correction value ΔVcont1.

The γNowi, determined by interpolation, is passed by an averaging process provided in the gamma conversion unit shown in FIG. 11, in order to reduce the quantization error resulting from the deficiency in the dynamic range of the 8-bit signal.

The present embodiment employs the calculation according to the equation (3), but there may also be employed an interpolating equation (4) with a suffix j:

$$\Gamma Nowj = \Gamma\alpha j + (\Gamma\beta j - \Gamma\alpha j) \times (Vcont\alpha - VcontNow)/(Vcont\alpha - Vcont\beta) \quad (4)$$

wherein Γ indicates a table of the output density signal corresponding to the output signal j and is an inverse function to γ.

The above-described embodiment employing the gamma conversion table according to the development contrast has the features shown in the following Tab. 1, in which comparison is made with a conventional example 1 in which the analog image adjustment alone is executed for example by the change of the development contrast only, and with a conventional example 2 in which the digital image adjustment alone is executed for example by an arbitrary change of the gamma conversion table only. The analog image adjustment as in the conventional example 1 results in a lowering of Dmax and at the same time in a lowering of the halftone density, thereby significantly deteriorating the apparent image quality. The lowered density itself results in phenomena such as weaker impression of the image, deteriorated gradation and thinning of the lines. On the other hand, the digital image adjustment as in the conventional example 2 shows a weaker effect of toner reduction in comparison with the analog image adjustment, thereby resulting in an extremely large loss of the halftone density in order to achieve the desired toner reducing effect, and has not effect in preventing the leak of the charger.

In contrast, in the present embodiment, the gamma conversion table is automatically modulated (change of the gamma conversion characteristics) simultaneously with the lowering of the development contrast, thereby maintaining the halftone density, though Dmax is lowered, thus avoiding poor impression of the image. This is due to a fact that the poor impression is not caused because of the weaker response of the human eyes to the density in the darker area as long as Dmax in the reflective density is at least equal to 1.1. Also the present embodiment allows to achieve reduction of the toner amount and prevention of the leak at the same time, thereby enabling to attain the image quality and other requirements at the same time, unlike the conventional examples 1 and 2 (see Table 1 below).

TABLE 1

| | Conventional example 1 | Conventional example 2 | Present Embodiment |
|---|---|---|---|
| Analog (development contrast lowered) | used | — | used |
| Digital (gamma conversion table modulated) | — | used | Automatically modulated according to development contrast |
| Dmax | lowered | maintained | lowered |
| Halftone density | low | significantly lower | maintained |
| Image in total | apparently poor | poor upon toner amount reduction | little influenced by lower Dmax |
| Drawback | defects in image | leak cannot be prevented | none |

As explained in the foregoing, the present embodiment allows to maintain the image quality as far as possible even in a situation where a lowering of the development contrast is unavoidable such as in reducing the toner consumption amount or avoiding the leak of the charger, by preparing gamma conversion tables corresponding to two development contrasts and calculating a suitable gamma conversion table according to the current development contrast.

Second Embodiment

Figure 13:
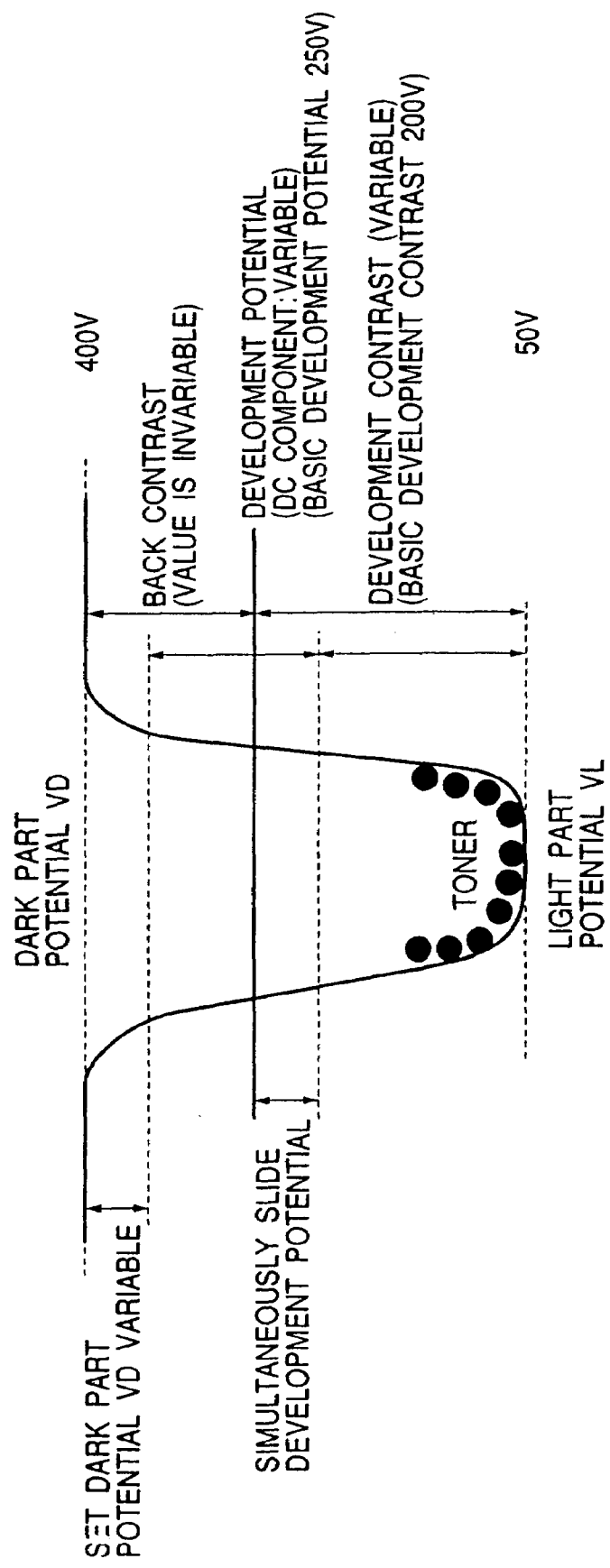
FIG. 13 is a chart showing a latent image potential and a development potential in an image exposure system in the second embodiment.

The foregoing first embodiment has been explained by a printer of the background exposure type in which the toner principally flies to the dark potential area, but the present invention is likewise applicable to a printer of the image exposure type in which the toner principally flies to the light potential area as shown in FIG. 13, and such example will be explained as the second embodiment.

In the image exposure system, the difference of the development potential and the light potential constitutes the development contrast, and the difference between the dark potential and the development potential constitutes the back potential. In the present embodiment there are assumed basic conditions of a dark potential of 400V, a light potential of 50V, a basic development potential of 250V, and a development contrast of 200V.

In the first embodiment, the development contrast is modulated by the modulation of the dark potential, but, in the present embodiment, the development contrast is modulated simultaneous with the dark potential. This is because the dark potential is not directly related to the development contrast in the image exposure system, in contrast to the first embodiment in which the dark potential has to be lowered for preventing the leak as shown in FIG. 9. Therefore, the back contrast remains unchanged by varying the development potential corresponding to the lowering of the dark potential, whereby the development contrast alone can be lowered without the variation such as increase of decrease of the fog level. The back contrast relating to the fog level, if made smaller, results in unnecessary adhesion of the toner called background fog, but, if made excessively large, results in a reversal fog induced by the toner which is charged in an opposite polarity or in an image stain called shadowing. It is therefore important to maintain the back contrast within a certain range, and the back contrast can be advantageously maintained constant by reducing the development potential in linkage with the dark potential. The printer of the present embodiment utilizing the lowered development potential allows, as in the first embodiment, to attain the prevention of the leak, the reduction of the toner consumption amount and the high image quality at the same time.

In the first embodiment, the present invention is realized by a printer of the background exposure type, but the present invention, considered from the standpoint of the development contrast, can also be realized, as in the present embodiment, in the printer of the image exposure system. More specifically, by reducing the development potential simultaneously with the lowering of the dark potential, it is rendered possible to achieve prevention of the leak of the charger and reduction of the toner consumption amount resulting from the lowered development contrast, and also to suppress the loss in the image quality by the optimum gamma conversion.

Third Embodiment

Figure 14:
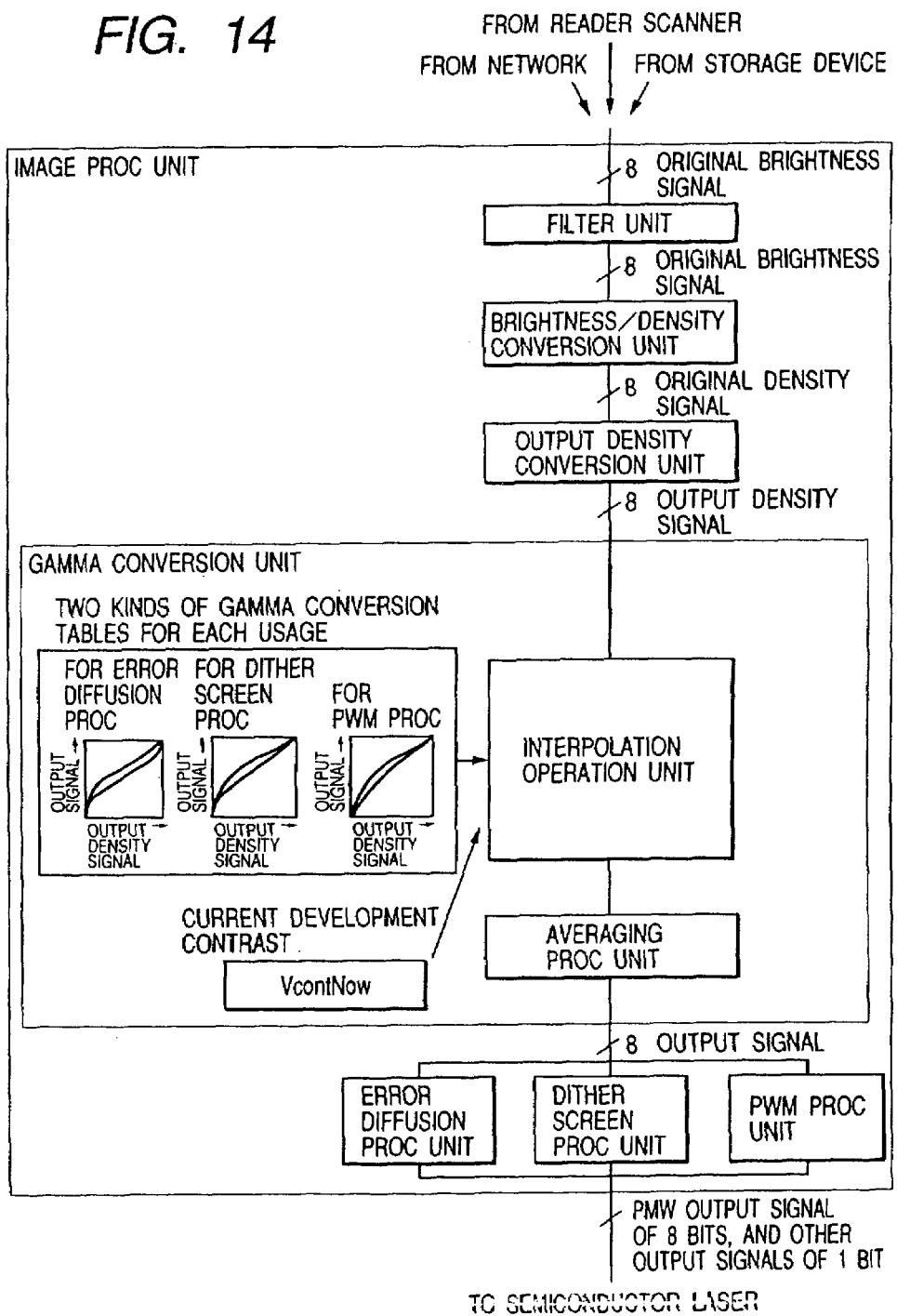
FIG. 14 is a view showing the configuration of an image processing unit in the third embodiment.

In the first embodiment shown in FIG. 3, the conversion to the binary level is executed in the error diffusion unit after the gamma conversion. In the present embodiment there will be explained a printer utilizing plural image processing methods including the error diffusion process. FIG. 14 is a schematic view showing the configuration of a digital image processing unit of the present embodiment, in which an original luminance signal read from a reader, a scanner, a network or a memory device such as a hard disk is subjected to an edge enhancement in a filter unit, then converted into an original density signal in a luminance-density conversion unit, and further converted into a desired output density signal in an output density conversion unit. The present embodiment is provided, for preparing signal data for driving the semiconductor laser, with an error diffusion process explained in the first embodiment, a dither screen process, and a pulse width modulation (PWM) process.

The present embodiment is featured by preparing two gamma conversion tables for each of the aforementioned three image processing methods, or six gamma conversion tables in total, and preparing a gamma conversion table corresponding to the current development contrast from two gamma conversion tables corresponding to the image processing method. In the dither screen process, the error diffusion process tends to generate more scattered toner dots on the photosensitive drum, thereby producing finer dots. For this reason, the gamma conversion table becomes different even for a same development contrast. Similarly the PWM process, having an already known tendency of generating dots more scattered in the main scanning direction and more connected in the sub scanning direction, requires gamma conversion tables different from those for the error diffusion process or for the dither screen process. Consequently there are required two gamma conversion tables corresponding to each of the three image processing methods. The error diffusion process is used for example in the character mode, because of its features that the stability of gradation is inferior to that in other process though the resolution is extremely high. On the other hand, the dither screen process is used for example in the photograph mode because of the excellent stability of the gradation though the resolution is inferior. The PWM process is positioned in properties between these two methods and is therefore used for example in the character photograph mode.

Figure 15:
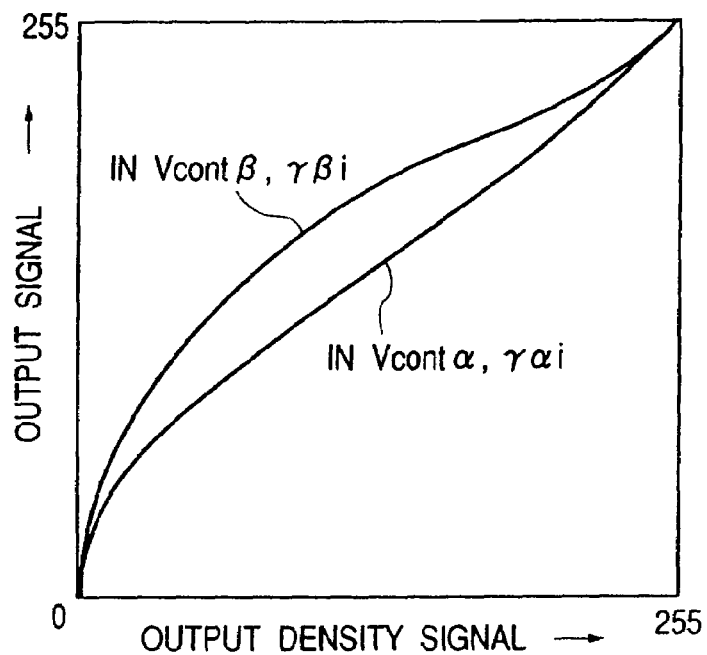
FIG. 15 is a view showing a gamma conversion table for dither screen process.
Figure 16:
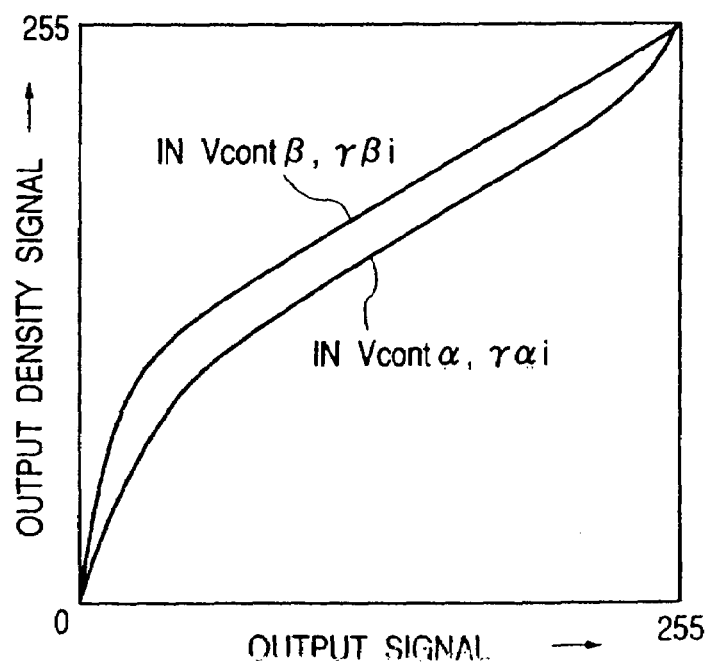
FIG. 16 is a view showing a gamma conversion table for PWM processing.

FIG. 15 shows gamma conversion tables for two development contrasts for use in the dither screen process, and FIG. 16 shows gamma conversion tables for two development contrasts for use in the PWM process. The gamma conversion unit is provided in advance with two gamma conversion tables for each of the three image processing methods, including those shown in FIG. 10, and a gamma conversion table corresponding to the current development contrast is prepared through an interpolation unit and an averaging unit. The present embodiment, in which an optimum gamma conversion table is automatically selected corresponding to the image processing method and the current development contrast, is capable of providing constantly stable images even in a situation where the development contrast has to be lowered.

As explained in the foregoing, the present embodiment allows, in a printer provided with plural image processing methods, to provide an optimum image according to the image processing method and the current development contrast, by preparing two gamma conversion tables for each of the image processing methods.

The foregoing embodiment allows to provide an image with little deterioration, even in case an adjustment of the image contrast is unavoidable not for the purpose of image adjustment.

Fourth Embodiment

In the foregoing first to third embodiments, the gamma (γ) development contrast VcontGamma (described as Vcont-Now in the first to third embodiments) for gamma conversion is practically defined as follows:

$$V\text{contGamma} = V\text{cont} + A \cdot \Delta \text{cont1} + B \cdot \Delta V\text{cont2}$$

wherein A=1, B=0, therefore $$V\text{contGamma} = V\text{cont} + \Delta V\text{cont1} \tag{5}$$

Therefore, it is defined solely by the first development contrast correction amount ΔVcont1 for correcting the development contrast and the basic development contrast Vcont. The first development contrast correction amount is determined by the reduction of the toner consumption amount in the development means or by the prevention of the leak in the charging means, and the deterioration of the image can be suppressed even when the development contrast has to be adjusted, by changing the content of conversion of the gamma conversion means according to the equation (5). On the other hand, the second development contrast correction amount is determined by the adjustment of the image density or the adjustment for the environmental fluctuation, and is not made to contribute to the convent of conversion of the gamma conversion means.

However, there may be encountered a following drawback if the reduction of the toner consumption amount or the prevention of the leak of the charging means alone is correlated with the content of conversion of the gamma conversion means as indicated by the equation (5).

An environmental fluctuation in the development characteristics causes a change not only in the halftone density but also in the toner adhesion amount even under a same development contrast. A change in the halftone density may be recognized as deterioration in the image quality. Also a change in the toner adhesion amount may affect the toner consumption amount and may induce a drawback, in case of excessive adhesion, for example scattering of the image or image deterioration in a portion where the toner surface is subjected to friction such as an enhanced trace of a separating finger of the fixing roller. In connection with such phenomenon, the experiments of the present inventors have clarified that the changes in the halftone density and in the toner adhesion amount, resulting from the environmental fluctuation do not take place at a same level. In the image forming apparatus employing digital a real gradation, the halftone density is generally determined by the toner deposition rate per area of the sheet, while the toner adhesion amount determining the image deterioration caused by the toner scattering or the trace of the separating finger can be regarded as the toner amount in the height direction with respect to the sheet. It has been found that the toner deposition under the environmental fluctuation does not change with a constant rate in the a real and height directions of the sheet but changes individually in these directions. Therefore, if the total development contrast VcontBody of the main body is so determined as to optimize the toner adhesion amount for the environmental fluctuation and if the content of conversion of the gamma conversion means is determined without taking the environmental fluctuation into consideration, the halftone density cannot reach the target density so that the desired toner adhesion amount and the desired halftone density cannot be attained at the same time. If the priority is given to the halftone density, naturally the total development contrast VcontBody of the main body does not become appropriate, so that the inadequate toner adhesion amount results in an unsatisfactory toner consumption amount or image deterioration such as toner scattering or a trace of the separating finger.

In the following embodiment, therefore, there are conceived following means for attaining the toner adhesion amount and the halftone density at the same time. More specifically, the development contrast in the main body is so adjusted as to optimize the toner adhesion amount, in consideration of the influence of the environmental fluctuation. At the same time, as the halftone density also shows a change though not in direct correlation, the development contrast based on the environmental fluctuation is corrected with a weight. More specifically, the gamma development contrast VcontGamma for gamma conversion is defined in the following manner:

$$V\text{contGamma} = V\text{cont} + A \cdot \Delta V\text{cont1} + B \cdot \Delta V\text{cont2} + C \cdot \Delta V\text{cont3}$$

wherein A=1, B=0, and C is a non-zero constant, therefore:

$$V\text{contGamma} = V\text{cont} + \Delta V\text{cont1} + C \cdot \Delta V\text{cont3} \quad (6)$$

The first development contrast correction amount $\Delta V\text{cont1}$ is used for reducing the toner consumption amount in the development means or for preventing the leak in the charging means, while the second development contrast correction amount $\Delta V\text{cont2}$ is used for adjusting the image density, and the third development contrast correction amount $\Delta V\text{cont3}$ is used for an adjustment for the environmental fluctuation. Since the constant C is larger than 0 but smaller than 1, the change in the halftone density resulting from the environmental fluctuation can be corrected in optimum manner.

Figure 17:
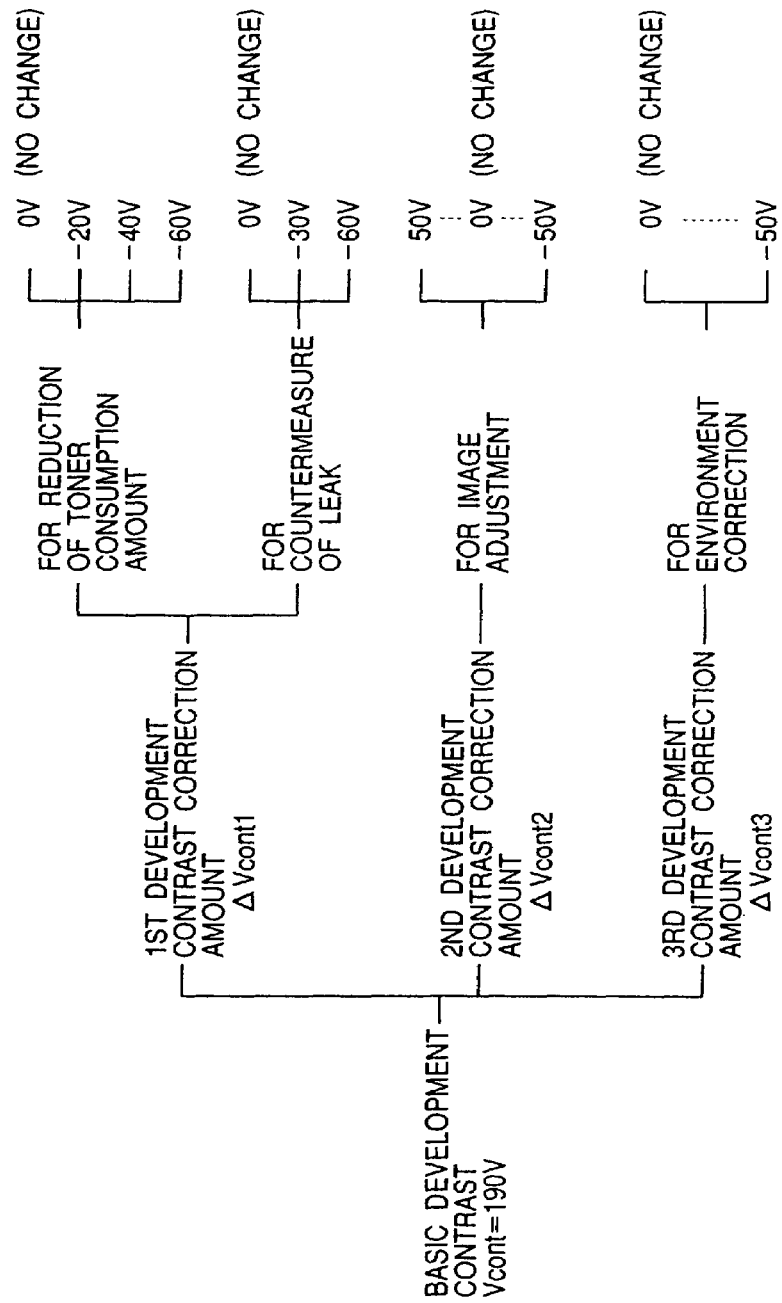
FIG. 17 is a chart showing adjustment items for determining the development contrast.

FIG. 17 shows the adjustment items for determining the development contrast. The basic development contrast (Vcont) is 190V as explained in FIG. 8. In the present embodiment, such basic development contrast is corrected by adding or subtracting three correction amounts, namely the first development contrast correction amount $\Delta V\text{cont1}$, the second development contrast correction amount $\Delta V\text{cont2}$ and the third development contrast correction amount $\Delta V\text{cont3}$ to or from the basic development contrast. Consequently, the total development contrast VcontBody at the actual output operation of the image forming apparatus is represented by:

$$V\text{contBody} = V\text{cont} + \Delta V\text{cont1} + \Delta V\text{cont2} + \Delta V\text{cont3} \quad (7)$$

Also in the present embodiment, the gamma development contrast for gamma conversion is defined according to the equation (6).

Also the development contrast not including the second development contrast correction amount $\Delta V\text{cont2}$ is defined as VcontGamma according to the equation (6), as will be explained later.

The first development contrast correction amount $\Delta V\text{cont1}$ is further divided into following two applications: namely for reducing the toner consumption amount and for avoiding leak in the charger. For the purpose of reducing the toner consumption amount, the $\Delta V\text{cont1}$ can be switched to 0V (no change), -20V, -40V or -60V. A reduction of the development contrast reduces the adhesion amount of the toner to the dark potential, thereby lowering the toner consumption amount. For the purpose of avoiding leak of the charger, it can be switched to 0V (no change), -30V or -60V. The leak prevention means the following. When the voltage applied to the primary charger is elevated, the primary charger in the printer located in a low air pressure situation generates spark discharge, and the dark potential has to be lowered in order to avoid the drawbacks resulting from such spark discharge.

The second development contrast correction value $\Delta V\text{cont2}$ is used for image adjustment, and can be finely set within a range from -50V to +50V. It is used by the service person for the image forming apparatus or the user thereof for the purpose of adjusting the entire image density to the darker or lighter side under the observation of the outputted image.

The third development contrast correction value $\Delta V\text{cont3}$ is used for environmental adjustment. For the environmental adjustment, the result of detection is read from a temperature-humidity sensor provided inside the image forming apparatus for calculating the moisture in the environment where the printer is installed, and the development contrast is automatically and continuously adjusted from 0V to -50V according to the moisture. This adjustment is executed in order to avoid a phenomenon that the development unit in the image forming apparatus shows a higher development ability in a lower moisture environment than in a higher moisture environment, whereby the toner adhesion amount becomes higher even if the surface potential of the photosensitive drum is maintained constant. Naturally such tendency is affected by the development characteristics of the development unit, and, in the present embodiment, the amount of reduction of $\Delta$Vcont3 had to be made smaller as the moisture becomes lower.

The first development contrast correction amount $\Delta$Vcont1 is to change the development regardless of the image quality. In case only one gamma conversion table shown in FIG. 6 is employed, there will result a lowering in the macroscopic halftone image as well as a lowering in Dmax indicating the density of the toner adhering to the dark potential, thus inducing an impression of significant image deterioration to the user. For this reason, the equation (7) determining the development contrast of the image forming apparatus and the equation (6) determining the gamma development contrast for gamma conversion include $\Delta$Vcont1 with a same contribution.

The second development contrast correction amount $\Delta$Vcont2 is used for image adjustment upon confirmation of the output image and is adjusted manually according to the image. Therefore a change in the development contrast serves to optimize the image quality. Stated differently, the second development contrast correction value $\Delta$Vcont2 is used in order to decrease Dmax and the halftone density when they are excessively high or to increase these when they are excessively low, and the density adjustment beyond these purposes should not be executed in digital manner. Therefore, though the equation (7) includes $\Delta$Vcont2 but it is unnecessary in the equation (6) for determining the gamma development contrast gamma conversion.

Figure 18:
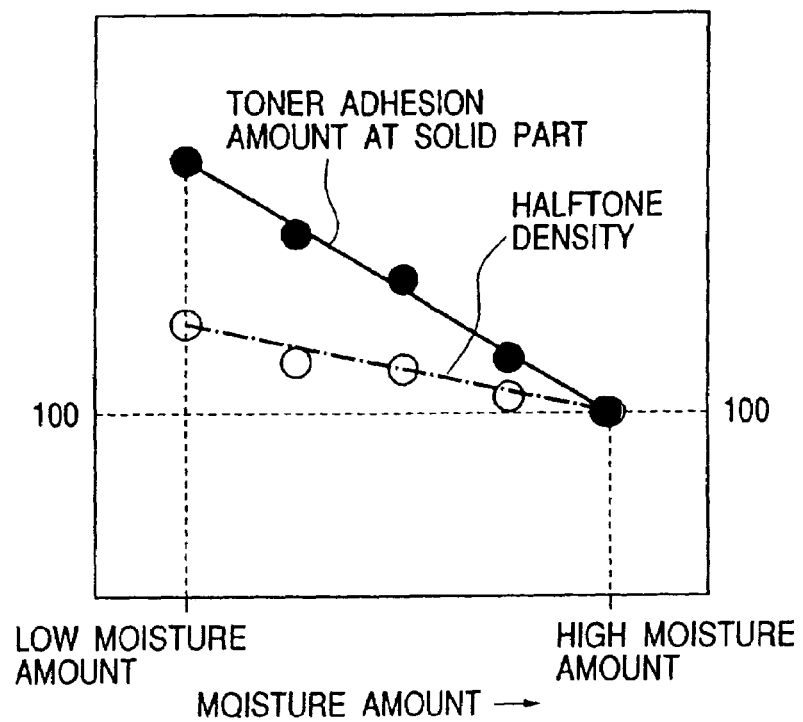
FIG. 18 is a chart showing the change in the toner adhesion amount in a solid image area and in the halftone density.

FIG. 18 shows the influence of the environmental fluctuation on the development characteristics, by the toner adhesion amount in a solid image area and by the density in a halftone area. It shows the variation rates of the solid area toner adhesion amount and the halftone density, taking the values thereof as 100 at a high moisture (22 g/kg), to a moisture situation (5 g/kg). For a lower moisture, the development unit shows a higher development ability, with increases both in the solid area toner adhesion amount and the halftone density, but the change rate is not same for the two. FIG. 18 shows that the change rate is higher for the solid area toner adhesion amount than for the halftone density.

Figure 19:
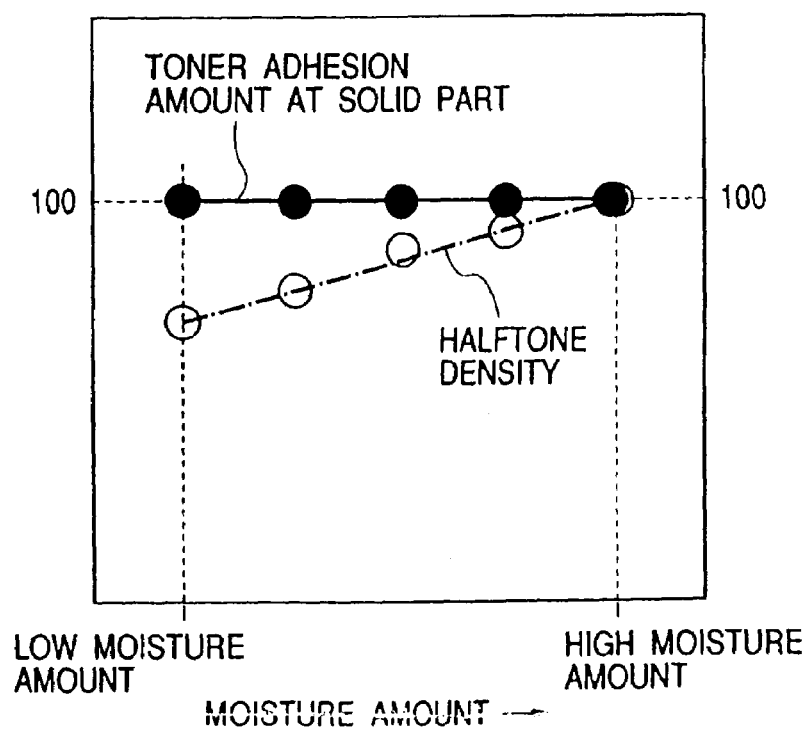
FIG. 19 is a chart showing the change in the halftone density in case the toner adhesion amount in the solid image area is made constant by a change in the development contrast under an environmental fluctuation.

Therefore, if the development contrast of the main body of the image forming apparatus is so changed, according to the moisture, as to stabilize the toner adhesion amount in the solid image area, the halftone density does not become constant as shown in FIG. 19. It will also be understood that, if the development contrast of the main body of the image forming apparatus is so changed, according to the moisture, as to stabilize the halftone density, the toner adhesion amount in the solid image area does not become constant. Thus, if the priority is given to the halftone density as in the conventional examples, there cannot be avoided the fluctuation in the toner adhesion amount, eventually leading to an increased toner consumption amount, a scattering of the image or a trace of the separating finger remaining on the sheet.

According to an experiment of the present inventors, the ratio of the change rates of the solid area toner adhesion amount and the halftone density as shown in FIG. 18 is 7:2 in the image forming apparatus employed for the experiment. This value may naturally be different in another image forming apparatus of another image forming system. The above-mentioned value means that, in case of determining the potential conditions for providing the optimum image characteristics under a high humidity environment for example of 22 g/kg and for obtaining the same image characteristics under a low humidity environment of 5 g/kg, the development contrast has to be reduced by 50V for the solid area toner adhesion amount and by about 15V for the halftone density. Stated differently, if the development contrast is reduced by 50V in order to stabilize the solid area toner adhesion amount in case of a shift from a high humidity environment to a low humidity environment, the halftone density is recovered partially corresponding to 15V but is still deficient corresponding to the remaining 35V (=50V−15V).

In the present invention, therefore, the halftone density is secured by a feedback of a portion corresponding to such 35V not to the contrast potential but to the content of conversion of the digital gamma conversion means. This is represented by a term C·$\Delta$Vcont3 in the equation (2). In the present embodiment, an optimum result can be obtained in case C=0.714 (=35/50V=5/7V), so that the equation (6) becomes:

$$V\text{contGamma} = V\text{cont} + \Delta V\text{cont1} + 0.714 \cdot \Delta V\text{cont3} \quad (6')$$

In the present invention, it is rendered possible to suppress the image deterioration without losing the halftone density, by preparing gamma conversion tables according to VcontGamma in the equation (6').

Figure 20:
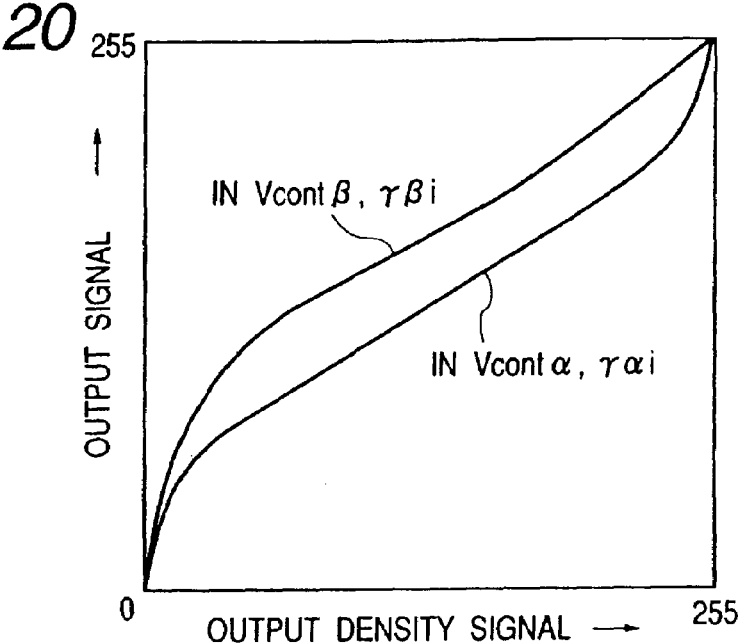
FIG. 20 is a chart showing two gamma conversion tables for error diffusion process for two development contrasts, provided in advance in an image forming apparatus.

FIG. 20 shows two gamma conversion tables prepared in advance in the image forming apparatus of the present invention and consisting of a gamma conversion table ($\gamma\alpha i$) for a case where the contrast correction amounts $\Delta$Vcont1, $\Delta$Vcont2 and $\Delta$Vcont3 are all 0V, namely a case of VcontGamma=Vcont=190V (Vcont$\alpha$), and a gamma conversion table ($\gamma\beta i$) for a case where Vcont is 140V (Vcont$\beta$), and a suffix i of the gamma conversion table indicates an 8-bit value of the output density signal of the table, assuming a value within a range of 0 to 255.

Figure 21:
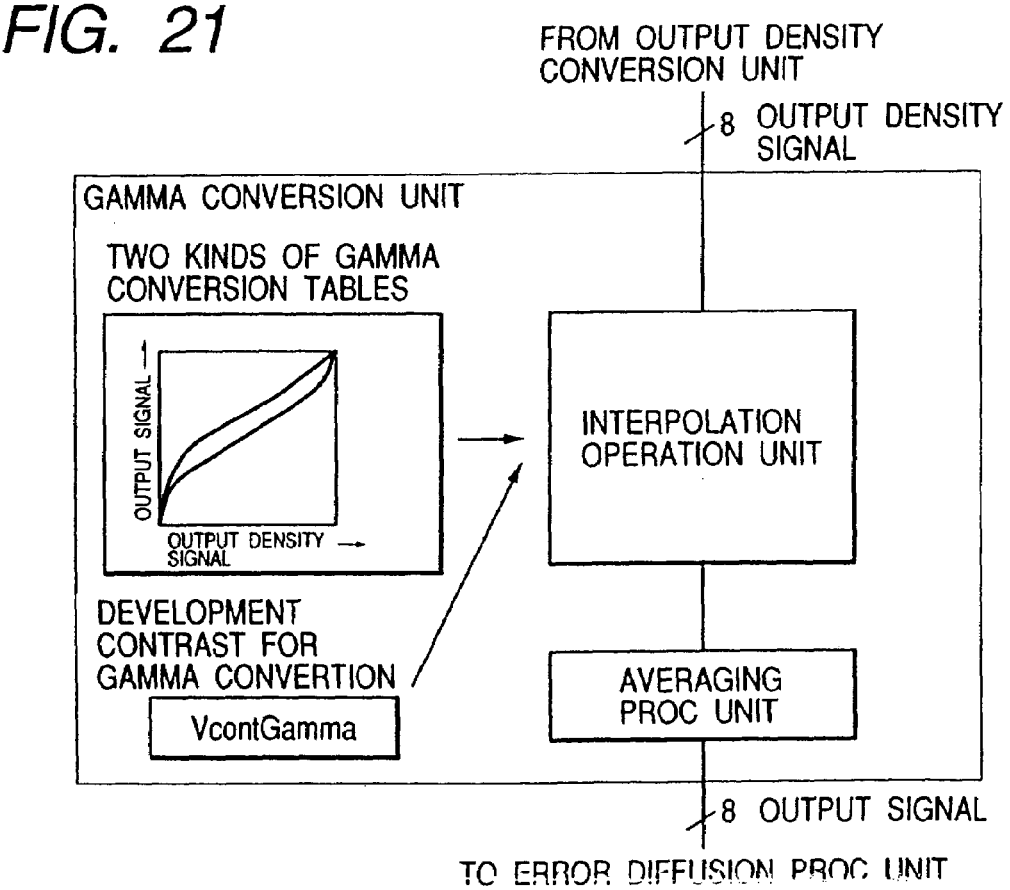
FIG. 21 is a view showing the configuration of a gamma conversion unit in an image processing unit in the fourth embodiment.
Figure 22:
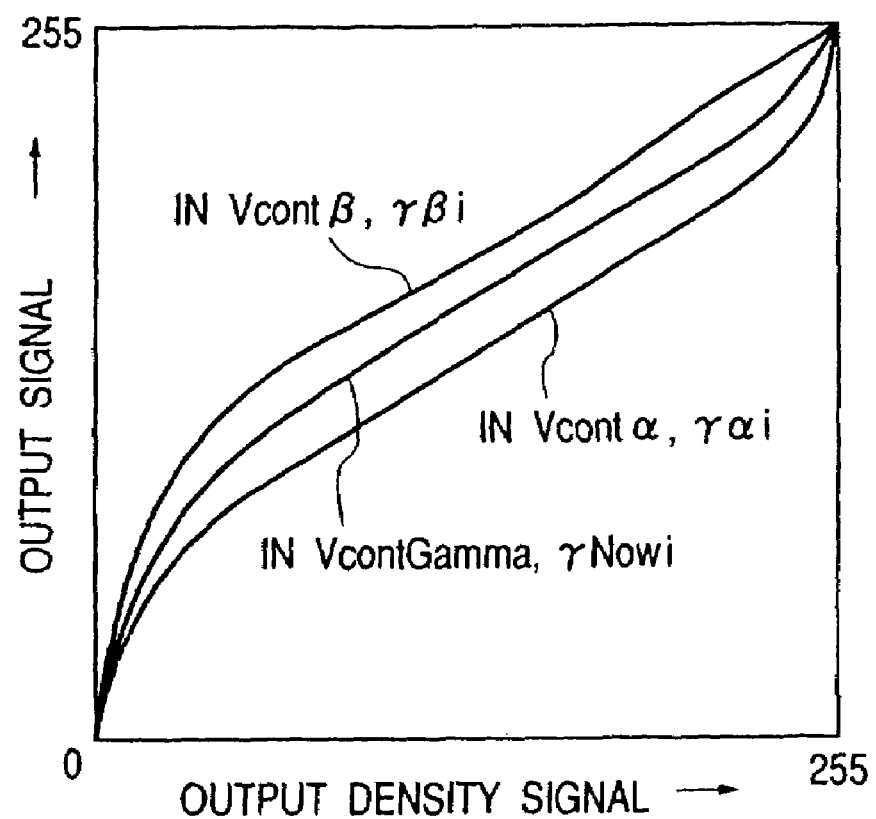
FIG. 22 is a chart showing an example of γNowi obtained from two development contrasts and a current development contrast.

The present embodiment functions with the aforementioned two gamma conversion tables, namely replacing the gamma conversion unit shown in FIG. 3 with that shown in FIG. 21. The gamma conversion unit shown in FIG. 21 is provided with two gamma conversion tables. Also, as shown in the equation (6'), VcontGamma is determined as the sum of the basic development contrast Vcont and 0.714 times of the third development contrast correction value $\Delta$Vcont3. The VcontGamma can vary by about 155V from the set value shown in FIG. 17, namely within a range of 190V to 35V. As the reduction of the toner consumption amount and the prevention of leak are not used often in combination in practice, it is generally used in the range of 190V to 100V. An interpolation calculation unit shown in FIG. 21 executes calculation based on the VcontGamma, the relationship between Vcont$\alpha$ and Vcont$\beta$, the conversion table at Vcont$\alpha$ and the conversion table at Vcont$\beta$, according to an interpolation equation:

$$\gamma\text{Now}i = \gamma\alpha i + (\gamma\beta i - \gamma\alpha i) \times (V\text{cont}\alpha - V\text{contGamma}) / (V\text{cont}\alpha - V\text{cont}\beta) \quad (8)$$

wherein the suffix i of the gamma conversion table is an 8-bit value of the output density signal of the table, assuming a value within a range of 0 to 255. The foregoing equation naturally assumes a value $\gamma\text{Now}i = \gamma\alpha i$ in case VcontGamma=Vcont$\alpha$, or $\gamma\text{Now}i = \gamma\beta i$ in case VcontGamma=Vcont$\beta$.

FIG. 21 shows an example of the result of calculation by the equation (8). In FIG. 12, γNowi is obtained by interpolation from the two gamma conversion tables γαi, γβi, and the VcontGamma which is the current sum of the basic development contrast Vcont and the first development contrast correction value ΔVcont1.

The γNowi, determined by interpolation, is passed by an averaging process provided in the gamma conversion unit shown in FIG. 21 in order to reduce the quantization error resulting from the deficiency in the dynamic range of the 8-bit signal.

The present embodiment employs the calculation according to the equation (8), but there may also be employed an interpolating equation (9) with a suffix j:

$$\Gamma\text{Now}j = \Gamma\alpha j + (\Gamma\beta j - \Gamma\alpha j) \times (V\text{cont}\alpha - V\text{contGamma}) / (V\text{cont}\alpha - V\text{cont}\beta) \quad (9)$$

wherein Γ indicates a table of the output density signal corresponding to the output signal j and is an inverse function to γ.

In the exploitation of the present invention, the gamma conversion tables prepared in advance and the current ones derived from the equation (8) or (9) are subjected to sufficient smoothing at the preparation of the tables prepared in advance or at the derivation of the current tables, in order to not to cause a jumping in the image gradation by the quantization error.

As explained in the foregoing, the present invention capable of individually optimizing the development characteristics under the influence of the environmental fluctuation provides the features shown in following Tab. 2, in comparison with the conventional examples. In the conventional examples, the change in the development characteristics induced by the environmental fluctuation is not taken into consideration sufficiently and the development contrast is merely changed so as to stabilize the halftone density, but the toner adhesion amount becomes excessively high in the solid image area because of the difference in the change rate, from the halftone density, under the environmental fluctuation. Such excessive toner adhesion leads to drawbacks such as an increased toner consumption amount, scattering of the image in the development, transferring or fixing unit, and an enhanced trace of the fixing finger in the solid image area. On the other hand, in the present invention, the development contrast is changed according to the toner adhesion amount in the solid image area, and the gamma conversion tables are so prepared as to compensate the deficiency in the halftone image. Consequently there can be simultaneously attained the toner adhesion amount in the solid image area and the halftone density, and there can be provided an image forming apparatus resistant to the environmental fluctuation (see Table 2 below).

TABLE 2

| | Conventional example | Present Embodiment |
|---|---|---|
| Consideration on development characteristics by environmental fluctuation | Change in development contrast only | Change in development contrast and modulation of gamma conversion table with weighting |
| Solid area toner adhesion amount | Stabilized by development contrast | Stabilized by development contrast |
| Halftone density | lower | Stabilized by gamma |

TABLE 2-continued

| | Conventional example | Present Embodiment |
|---|---|---|
| | | conversion table |
| Drawback | Poor image by lowered halftone density | none |

In the present embodiment, the equation (6') is defined for an image forming apparatus showing higher values of the solid area toner adhesion amount and the halftone density at a lower humidity environment, but the constant C may assume a negative value depending on the image forming system of the image forming apparatus. Also there has been explained a case where the change in the solid area toner adhesion amount is larger than that in the halftone density, but it will be apparent that the present invention is applicable also in an opposite case.

Also in the present embodiment, an environment sensor is provided as the environment detection means and the moisture in the environment where the image forming apparatus is installed is measured from the temperature and humidity from such sensor, but a sensor for the temperature only or for the humidity only may be employed for the purpose of cost reduction.

Fifth Embodiment

Figure 23:
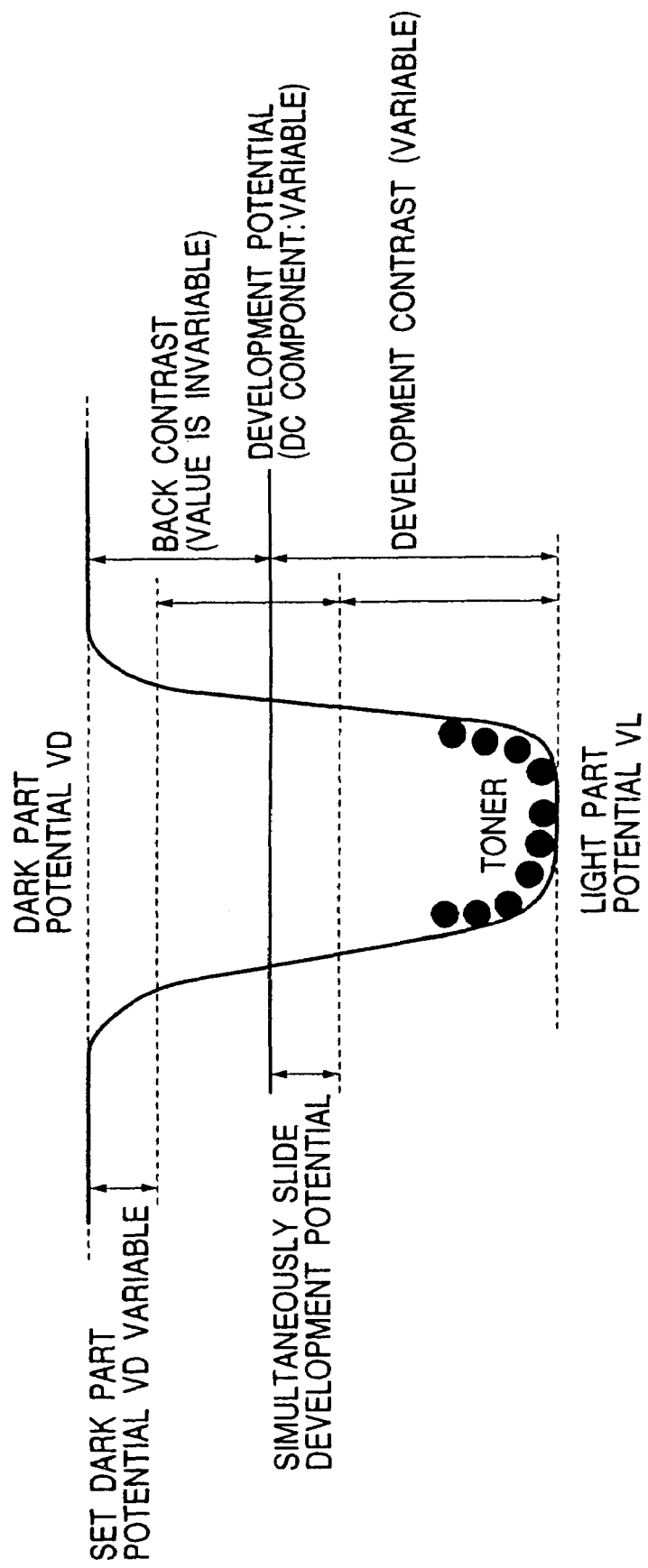
FIG. 23 is a chart showing the latent image potential and the development potential in the image exposure system in the fifth embodiment.

The foregoing fourth embodiment has been explained by an image forming apparatus of the background exposure type in which, as shown in FIG. 8, the toner principally flies to the dark potential area, but the present invention is likewise applicable to an image forming apparatus of the image exposure type in which the toner principally flies to the light potential area as shown in FIG. 23.

In the image exposure system, the difference of the development potential and the light potential constitutes the development contrast, and the difference between the dark potential and the development potential constitutes the back potential. In the present embodiment there are assumed basic conditions of a dark potential of 400V, a light potential of 50V, a basic development potential of 250V, and a development contrast of 200V.

In the fourth embodiment, the development contrast is modulated by the modulation of the dark potential, but, in the present embodiment, the development contrast is modulated simultaneous with the dark potential. This is because the dark potential is not directly related to the development contrast in the image exposure system, in contrast to the fourth embodiment in which the dark potential has to be lowered for preventing the leak as shown in FIG. 17. Therefore, the back contrast remains unchanged by varying the development potential corresponding to the lowering of the dark potential, whereby the development contrast alone can be lowered without the variation such as increase of decrease of the fog level. The back contrast relating to the fog level, if made smaller, results in unnecessary adhesion of the toner called background fog, but, if made excessively large, results in a reversal fog induced by the toner which is charged in an opposite polarity or in an image stain called shadowing. It is therefore important to maintain the back contrast within a certain range, and the back contrast can be advantageously maintained constant by reducing the development potential in linkage with the dark potential. The image forming apparatus of the present embodiment utilizing the lowered development potential allows, as in the fourth embodiment, to attain the prevention of the leak, the reduction of the toner consumption amount and the high image quality at the same time, and, even under an environmental fluctuation at the same time, the image is not deteriorated because the development contrast is modulated for stabilizing the solid area toner adhesion amount and the gamma conversion table is modulated for stabilizing the halftone density.

Therefore, the present invention employing the gamma conversion corresponding to the development contrast is applicable also to the image forming apparatus of the image exposure type.

Sixth Embodiment

Figure 24:
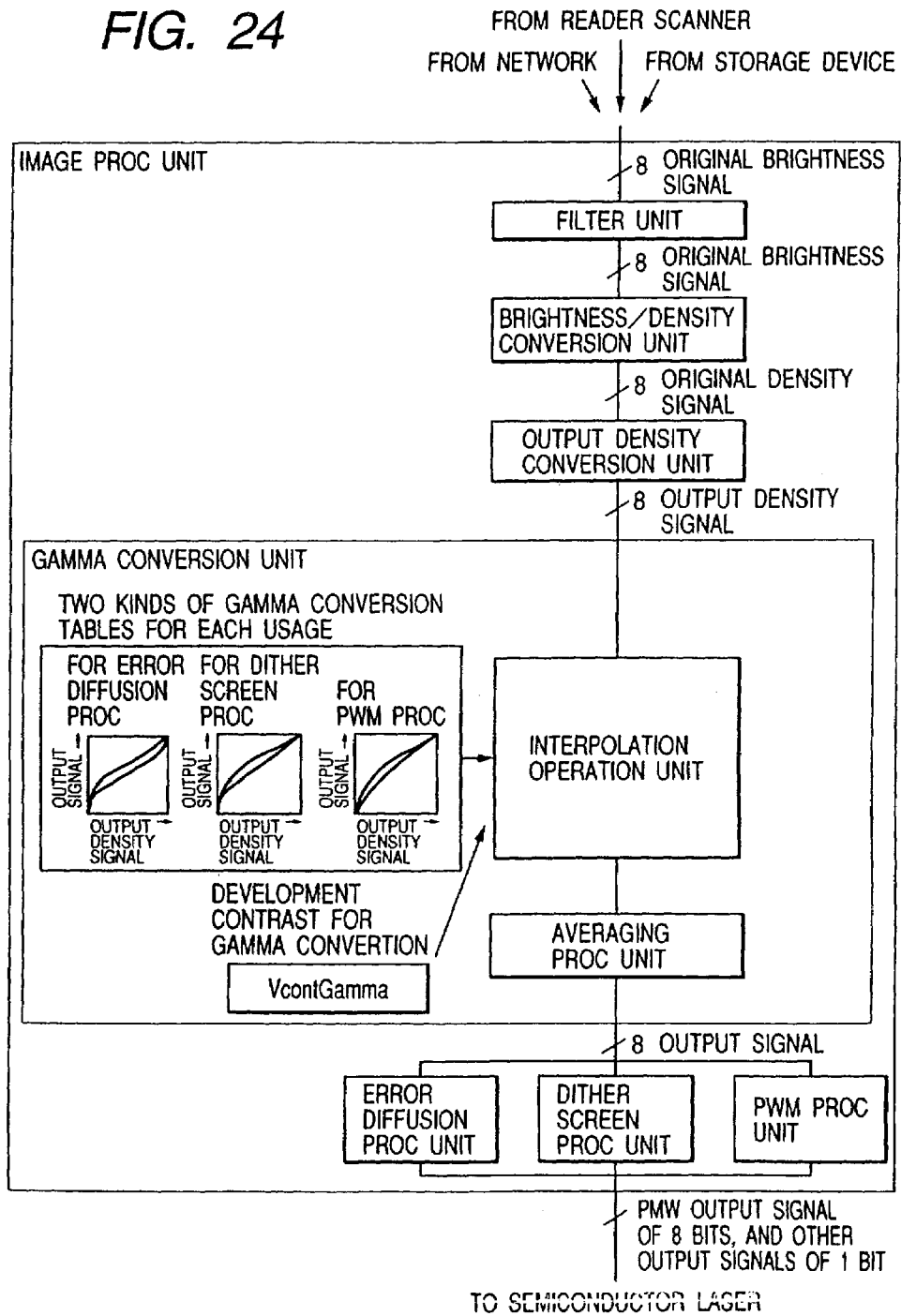
FIG. 24 is a view schematically showing the configuration of an image processing portion in an image forming apparatus with plural image processing methods in the sixth embodiment.

In the fourth embodiment, as shown in FIG. 3, the conversion to the binary level is executed in the error diffusion unit after the gamma conversion. In the present embodiment there will be explained an image forming apparatus utilizing plural image processing methods including the error diffusion process. FIG. 24 is a schematic view showing the configuration of a digital image processing unit of the present embodiment, in which an original luminance signal read from a reader, a scanner, a network or a memory device such as a hard disk is subjected to an edge enhancement in a filter unit, then converted into an original density signal in a luminance-density conversion unit, and further converted into a desired output density signal in an output density conversion unit. The present embodiment is provided, for preparing signal data for driving the semiconductor laser, with an error diffusion process explained in the fourth embodiment, a dither screen process, and a pulse width modulation (PWM) process.

The present embodiment is featured by preparing two gamma conversion tables for each of the aforementioned three image processing methods, or six gamma conversion tables in total, and preparing a gamma conversion table corresponding to the current development contrast from two gamma conversion tables corresponding to the image processing method. In the dither screen process, the error diffusion process tends to generate more scattered toner dots on the photosensitive drum, thereby producing finer dots. For this reason, the gamma conversion table becomes different even for a same development contrast. Similarly the PWM process, having an already known tendency of generating dots more scattered in the main scanning direction and more connected in the sub scanning direction, requires gamma conversion tables different from those for the error diffusion process or for the dither screen process. Consequently there are required two gamma conversion tables corresponding to each of the three image processing methods. The error diffusion process is used for example in the character mode, because of its features that the stability of gradation is inferior to that in other process though the resolution is extremely high. On the other hand, the dither screen process is used for example in the photograph mode because of the excellent stability of the gradation though the resolution is inferior. The PWM process is positioned in properties between these two methods and is therefore used for example in the character photograph mode.

Figure 25:
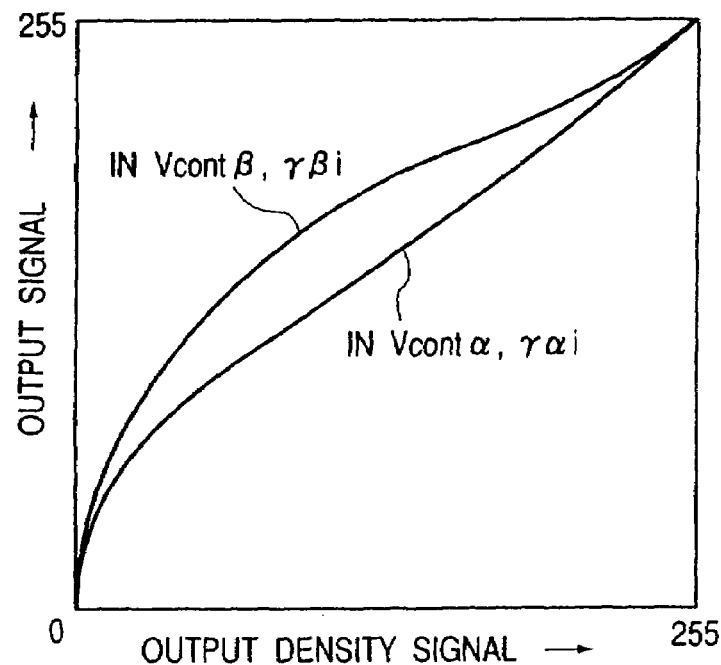
FIG. 25 is a chart showing two gamma conversion tables for dither screen processing for two development contrasts, provided in advance in the image forming apparatus of the sixth embodiment.
Figure 26:
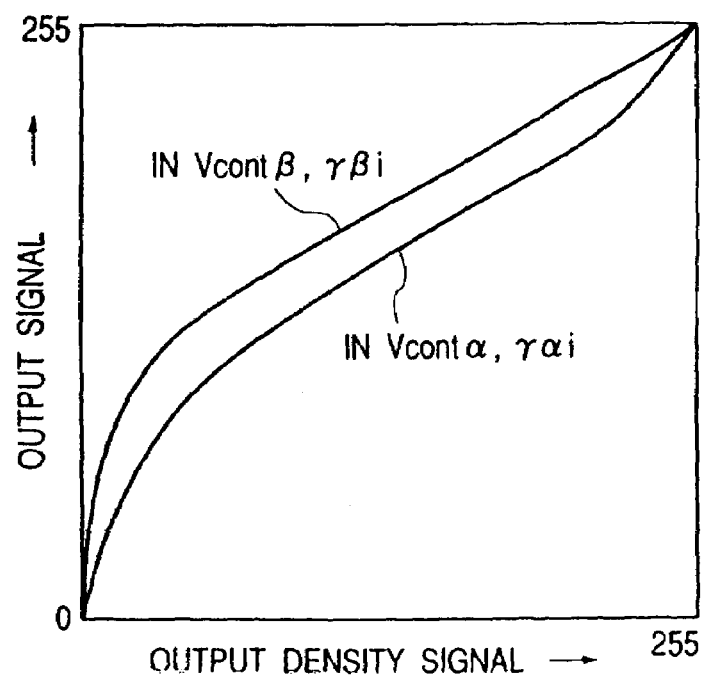
FIG. 26 is a chart showing two gamma conversion tables for PWM processing for two development contrasts, provided in advance in the image forming apparatus of the sixth embodiment.

FIG. 25 shows gamma conversion tables for two development contrasts for use in the dither screen process, and FIG. 26 shows gamma conversion tables for two development contrasts for use in the PWM process. The gamma conversion unit is provided in advance with two gamma conversion tables for each of the three image processing methods, including those shown in FIG. 6, and a gamma conversion table corresponding to the current development contrast is prepared through an interpolation unit and an averaging unit. The present embodiment, in which an optimum gamma conversion table is automatically selected corresponding to the image processing method and the current development contrast, is capable of providing constantly stable images even in a situation where the development contrast has to be lowered.

In the fourth to sixth embodiments, there are prepared in advance the gamma conversion tables corresponding to the two development contrasts and an optimum gamma conversion table is calculated according to the current development contrast, whereby the image quality represented by the solid area toner adhesion amount and the halftone density can be stabilized not only in a situation where the development contrast has to be lowered such as in the reduction of the toner consumption amount or in the prevention of the leak of the charger, but also under any environment (as described in the first embodiment).

In the fourth embodiment, there has been explained an image forming apparatus of the background exposure system, but the present invention is also applicable to an image forming apparatus of the image exposure system, taking the development contrast as a parameter. Thus, by lowering the development potential simultaneously with the lowering of the dark potential, the image quality represented by the solid area toner adhesion amount and the halftone density can be stabilized not only in case of reducing the toner consumption amount or in case of preventing the leak of the charger but also under any environment (as described in the fifth embodiment).

Also in the image forming apparatus provided with plural different image processing methods, an optimum image can be provided according to the image processing method and the development contrast, by preparing two gamma conversion tables for each of the image processing methods (as described in the sixth embodiment).

The present invention has been explained by certain preferred embodiments thereof, but the present invention is not limited to such the embodiments and is subject to various modifications and applications within the scope and spirit of the appended claims.

What is claimed is:

1. An image forming apparatus which visualizes an image from a latent image potential on an image bearing body consisting of a charging unit and an exposing unit, and a development potential applied to a developing unit, said image forming apparatus comprising:

an environment detection unit adapted to detect at least one of temperature and humidity, wherein, in a first image adjustment mode, a conversion content of a gamma conversion unit is modified according to a development contrast being a difference between the latent image potential and the development potential, the modification of the conversion content of the gamma conversion unit includes weight of a variation of the gamma conversion unit to a variation of the development contrast in a detection result of said environment detection unit and weight of a variation of the gamma conversion unit to a variation of the development contrast in another case, wherein in a second image adjustment mode, the conversion content of the gamma conversion unit is not modified according to the development contrast being the difference between the latent image potential and the development potential, and wherein, in said first image adjust mode,
a target development contrast VcontBody in the development contrast is indicated by the sum total of a basic development contrast Vcont, a first development contrast correction ΔVcont1, a second development contrast correction ΔVcont2, and a third development contrast correction amount ΔVcont3 for correcting the basic development contrast Vcont, that is, VcontBody=Vcont+ΔVcont1+ΔVcont2+ΔVcont3, and
a gamma development contrast VcontGamma, in case of executing gamma conversion, is indicated by VcontGamma=Vcont+A·ΔVcont1+B·ΔVcont2+ C·ΔVcont3, where it is defined that A=1, B=0, and C is a constant other than 0, and thus the conversion content of the gamma conversion unit is set according to the gamma development contrast VcontGamma.

2. An image forming apparatus according to claim 1, wherein said first image adjustment mode is an image adjustment mode which is to reduce a toner consumption amount or deal with leakage of said charging unit, or is achieved by environment correction, and
wherein said second image adjustment mode is the image adjustment mode which is achieved by ordinary image density adjustment.

3. An image forming apparatus according to claim 1, wherein the development contrast is the difference between the latent image potential that toner applied from said development unit is adhered to the image bearing body and the development potential.

4. An image forming apparatus which visualizes an image from a latent image potential on an image bearing body consisting of a charging unit and an exposing unit, and a development potential applied to a developing unit, said image forming apparatus comprising:
an environment detection unit adapted to detect at least one of temperature and humidity,
wherein, in a first image adjustment mode, a conversion content of a gamma conversion unit is modified according to a development contrast being a difference between the latent image potential and the development potential, the modification of the conversion content of the gamma conversion unit includes weight of a variation of the gamma conversion unit to a variation of the development contrast in a detection result of said environment detection unit and weight of a variation of the gamma conversion unit to a variation of the development contrast in another case,
wherein in a second image adjustment mode, the conversion content of the gamma conversion unit is not modified according to the development contrast being the difference between the latent image potential and the development potential,
wherein, in said first image adjust mode,
a target development contrast VcontBody in the development contrast is indicated by the sum total of a basic development contrast Vcont, a first development contrast correction ΔVcont1, a second development contrast correction ΔVcont2, and a third development contrast correction amount ΔVcont3 for correcting the basic development contrast Vcont, that is, VcontBody=Vcont+ΔVcont1+ΔVcont2+ΔVcont3, and
a gamma development contrast VcontGamma, in case of executing gamma conversion, is indicated by VcontGamma=Vcont+A·ΔVcont1+B·ΔVcont2+ C·ΔVcont3, where it is defined that A=1, B=0, and C is a constant other than 0, and thus the conversion content of the gamma conversion unit is set according to the gamma development contrast VcontGamma, and
wherein the first development contrast correction amount is used to reduce a toner consumption amount or deal with leakage of said charging unit.

5. An image forming apparatus which visualizes an image from a latent image potential on an image bearing body consisting of a charging unit and an exposing unit, and a development potential applied to a developing unit, said image forming apparatus comprising:
an environment detection unit adapted to detect at least one of temperature and humidity,
wherein, in a first image adjustment mode, a conversion content of a gamma conversion unit is modified according to a development contrast being a difference between the latent image potential and the development potential, the modification of the conversion content of the gamma conversion unit includes weight of a variation of the gamma conversion unit to a variation of the development contrast in a detection result of said environment detection unit and weight of a variation of the gamma conversion unit to a variation of the development contrast in another case,
wherein in a second image adjustment mode, the conversion content of the gamma conversion unit is not modified according to the development contrast being the difference between the latent image potential and the development potential,
wherein, in said first image adjust mode,
a target development contrast VcontBody in the development contrast is indicated by the sum total of a basic development contrast Vcont, a first development contrast correction ΔVcont1, a second development contrast correction ΔVcont2, and a third development contrast correction amount ΔVcont3 for correcting the basic development contrast Vcont, that is, VcontBody=Vcont+ΔVcont1+ΔVcont2+ΔVcont3, and
a gamma development contrast VcontGamma, in case of executing gamma conversion, is indicated by VcontGamma=Vcont+A·ΔVcont1+B·ΔVcont2+ C·ΔVcont, where it is defined that A=1, B=0, and C is a constant other than 0, and thus the conversion content of the gamma conversion unit is set according to the gamma development contrast VcontGamma, and
wherein the second development contrast correction amount is used to adjust image density.

6. An image forming apparatus which visualizes an image from a latent image potential on an image bearing body consisting of a charging unit and an exposing unit, and a development potential applied to a developing unit, said image forming apparatus comprising:
an environment detection unit adapted to detect at least one of temperature and humidity,
wherein, in a first image adjustment mode, a conversion content of a gamma conversion unit is modified according to a development contrast being a difference between the latent image potential and the development potential, the modification of the conversion content of the gamma conversion unit includes weight of a variation of the gamma conversion unit to a variation of the development contrast in a detection result of said environment detection unit and weight of a variation of the gamma conversion unit to a variation of the development contrast in another case,
wherein in a second image adjustment mode, the conversion content of the gamma conversion unit is not modified according to the development contrast being the difference between the latent image potential and the development potential, wherein, in said first image adjust mode, a target development contrast VcontBody in the development contrast is indicated by the sum total of a basic development contrast Vcont, a first development contrast collection $\Delta$Vcont1, a second development contrast correction $\Delta$Vcont2, and a third development contrast correction amount $\Delta$Vcont3 for correcting the basic development contrast Vcont, that is, VcontBody=Vcont+$\Delta$Vcont1+$\Delta$Vcont2+$\Delta$Vcont3, and a gamma development contrast VeontGamma, in case of executing gamma conversion, is indicated by VcontGamma=Vcont+A·$\Delta$Vcont1+B·$\Delta$Vcont2+ C·$\Delta$Vcont3, where it is defined that A=1, B=0, and C is a constant other than 0, and thus the conversion content of the gamma conversion unit is set according to the gamma development contrast VcontGamma, and wherein the third development contrast correction amount is used to adjust a variation due to environment.

7. An image forming method which visualizes an image from a latent image potential on an image bearing body consisting of a charging unit and an exposing unit, and a development potential applied to a developing unit, said method comprising:

an environment detection step of detecting at least one of temperature and humidity, wherein, in a first image adjustment mode, a conversion content of a gamma conversion unit is modified according to a development contrast being a difference between the latent image potential and the development potential, the modification of the conversion content of the gamma conversion unit includes weight of a variation of the gamma conversion unit to a variation of the development contrast in a detection result of said environment detection step and weight of a variation of the gamma conversion unit to a variation of the development contrast in another case, wherein in a second image adjustment mode, the conversion content of the gamma conversion unit is not modified according to the development contrast being the difference between the latent image potential and the development potential, and wherein, in said first image adjust mode, a target development contrast VcontBody in the development contrast is indicated by the sum total of a basic development contrast Vcont, a first development contrast collection $\Delta$Vcontl, a second development contrast correction $\Delta$Vcont2, and a third development contrast correction amount $\Delta$Vcont3 for correcting the basic development contrast Vcont, that is, VcontBody=Vcont+$\Delta$Vcont1+$\Delta$Vcont2+$\Delta$Vcont3, and a gamma development contrast VcontGamma, in case of executing gamma conversion, is indicated by VcontGamma=Vcont+A·$\Delta$Vcont1+B·$\Delta$Vcont2+ C·$\Delta$Vcont3, where it is defined that A=1, B=0, and C is a constant other than 0, and thus the conversion content of the gamma conversion unit is set according to the gamma development contrast VcontGamma.

* * * * *

UNITED STATES PATENT AND TRADEMARK OFFICE
CERTIFICATE OF CORRECTION

PATENT NO. : 7,259,885 B2 Page 1 of 1
APPLICATION NO. : 11/080490
DATED : August 21, 2007
INVENTOR(S) : Yuji Kamiya It is certified that error appears in the above-identified patent and that said Letters Patent is hereby corrected as shown below:

COLUMN 13:
Line 8, "convert of" should be deleted.

COLUMN 22:
Line 41, "C·ΔVcont," should read --C·ΔVcont3,--.

Signed and Sealed this

Third Day of June, 2008

JON W. DUDAS
*Director of the United States Patent and Trademark Office*